US005699326A

United States Patent [19]

Haas et al.

[11] Patent Number: 5,699,326

[45] Date of Patent: Dec. 16, 1997

[54] TIME INDICATOR

[75] Inventors: David J. Haas; Sandra F. Haas, both of Suffern, N.Y.

[73] Assignee: Temtec, Inc., Suffern, N.Y.

[21] Appl. No.: 771,765

[22] Filed: Oct. 4, 1991

Related U.S. Application Data

[63] Continuation-in-part of Ser. No. 602,120, Oct. 22, 1990, which is a continuation-in-part of Ser. No. 460,753, Jan. 4, 1990, Pat. No. 5,058,088.

[51] Int. Cl.$^6$ ............................ G04B 17/00; G01N 31/32

[52] U.S. Cl. ............................ 368/327; 116/200

[58] Field of Search ............................ 368/323, 62, 114, 368/121; 116/200, 207, 217, 300

[56] References Cited

U.S. PATENT DOCUMENTS 5,058,088 10/1991 Haas et al. .............................. 368/327

5,107,470 4/1992 Pedicano et al. .............................. 368/327

*Primary Examiner*—Bernard Roskoski

*Attorney, Agent, or Firm*—Michael E. Zall

[57] ABSTRACT

A time indicator comprising a front part and a rear part, the rear part comprising an ink pattern layer overlaying a rear support member. The front part comprises a transparent front support layer, and an opaque adhesive layer having a front ink display surface, the adhesive layer capable of dissolving the ink pattern on the rear part, whereby contacting the front part with the rear part by applying the opaque adhesive layer onto the ink pattern layer activates the dissolution and migration of ink in a selected time interval from the ink pattern layer, through the opaque adhesive layer to the front ink display surface for viewing through the transparent front support layer.

6 Claims, 16 Drawing Sheets

TIME INDICATOR

RELATED APPLICATIONS

This application is a Continuation-In-Part application of U.S. application Ser. No. 07/602,120 filed Oct. 22, 1990 (3.0-011/CIP) which is a Continuation-In-Part of U.S. application Ser. No. 07/460,753, filed Jan. 4, 1990, entitled, "Patterned Indicators," now U.S. Pat. No. 5,058,088 (3.0-011), the entire disclosures of which are incorporated herein by reference.

BACKGROUND OF THE INVENTION

1. Field of the Invention

This invention relates to a time indicator and, in particular, to a time indicator which provides a clearer indication of expiration.

This invention also relates to patterned indicators, wherein latent information is contained within a pattern. The latent pattern is revealed upon the application of an activator or stimulus to the pattern.

In particular, this invention relates to an indicator wherein the relative amount of time that has elapsed from the initial activation of the indicator can be rapidly and easily determined by the progression of a visually perceptible change in color along different areas of the indicator.

This invention further relates to indicators wherein a latent pattern hidden in an array is brought forth upon application of activator or stimulus or after a period of time to reveal or conceal information. This invention also relates to a novel means for adjusting selected time periods for such indicators.

2. Prior Art

Numerous devices are known which provide a visual indication of the passage of a pre-arranged amount of time. Such time indicators are useful, for example, when attached to perishable items for indicating the length of time the items have been on the wholesaler's or retailer's shelf. Thus, foods, photographic materials and other perishable items can be provided with indicators which after being activated, evidence a visual change, after the passage of a predetermined period of time. Time-temperature indicators are also known which indicate a visual change as a function of both time and temperature. Virtually any time indicator however is also, at least to a minor extent, dependent upon temperature.

A preferred prior art time indicator is described in U.S. Pat. No. 4,903,254 to Haas and U.S. Pat. No. 4,212,153, of Kydonieus et al. This invention is an improvement on the invention described in these patents.

U.S. Pat. No. 4,212,153 to Kydonieus et al. describes a laminated time indicator including a two-layer front indicator part and a two-layer rear reservoir part. The front indicator part has an indicator layer with an outer display surface and an inner surface having an adhesive layer thereon. For example, a pressure-sensitive adhesive coated onto an opaque barrier layer such as vinyl. The rear reservoir part has a dye or ink film layer and a support card layer. When assembled, the front part is placed on the rear part with the ink film layer forming an assembly joint with the adhesive layer. The dye or ink dissolves in the adhesive. After a period of time, the ink migrates from the ink film layer through the adhesive layer and through the indicator layer to be displayed on the outer surface. In one day, for example, the dye or ink may only reach 20% to 30% of its potential color capacity due to the gradual migration (or adsorption) of the dye into the opaque indicator layer and due to the fact that as the concentration of dye increases at the surface, the process rate decreases. Thus, there is no clear indication of when the indicator expires. It is believed that the reason this prior art device has such deficiencies is due to the fact that the opaque indicator layer must be relatively thick to provide mechanical strength. Such thickness creates a long path through which the dye or ink must migrate, this causing a gradual darkening of the indicator. Further, the opaque indicator layer must have a relatively large quantity of filler, e.g. titanium dioxide, to make it opaque. This filler intermixes and/or adsorbs the dye as the dye migrates through the indicator layer and dilutes or decreases the intensity of the dye. Thus, a red dye or ink will mix and/or be adsorbed with the titanium dioxide and become pink. Kydonieus et al also further describes the use of a step-wedge test color panel placed next to the indicator which is used to compare the developed color or shade. The step-wedge can be provided with indicia corresponding to the time period required to develop the color at each step of the wedge.

U.S. Pat. No. 4,903,254 to Haas is an attempt to resolve some of the problems presented by the time indicators of Kydonieus et al. In particular, Haas '254 describes a badge which includes a four-layer front part and a two layer rear part. The front part has, overlaying each other, (1) a transparent front support layer with a front print display surface, (2) an ink display layer with a front ink display surface, (3) an optical barrier layer; and (4) an adhesive and ink dissolver layer. The rear part has (1) an ink film layer overlaying (2) a backup member layer.

Upon issuance of the badge, a release sheet is peeled off the front part and it is overlaid and pressed down upon the rear part, with the adhesive and ink dissolver layer and the ink film layer forming an assembly joint therebetween. This causes the ink dissolver and ink film to mix. The ink then migrates from the ink film layer, through the assembly joint, through the ink dissolver layer, through the optical barrier layer, through the adhesive and ink display layer to the front ink display surface, where it forms, for example, expiration notice words and diagonal voiding bars at the expiration of the time interval. A viewer can see the user's name and category on the front print display surface, as placed thereon when issued. Upon expiration, after a predetermined period of time, the viewer can see the expiration notice words and diagonal voiding bars on the front ink display surface behind the front print display surface. As can be readily seen from the foregoing, such a structure is complex and relatively difficult to manufacture.

Applicant is aware of the following additional prior art, none of which teach or suggest the invention claimed herein.

U.S. Pat. No. 2,337,534 to Barber, describes a magazine page exposure time indicator which includes a photosensitive paper sheet mounted on a magazine page, and a developed photographic film sheet having a series of adjacent portions of varying density mounted over the photosensitive paper sheet.

U.S. Pat. No. 3,018,611 to Biritz describes a time indicator device which may be used for frozen foods, parking, construction sites, etc. The device comprises a backing which is attachable to the outer surface of, for example, a package of frozen food. Superimposed on the backing is a strip of filter paper having a chemical reagent laminated thereto. The chemical reagent is an oxygen reactive material. The strip is hermetically sealed by a covering of transparent., impervious pressure sensitive cellophane which allows visual inspection of the oxygen reactive layer. A pin-hole size opening is provided in the covering to allow for ingress of air within the interior of the container. This opening is sealed by a removable tape. When the tape is removed the oxygen reactive material reacts to change color by permitting air to enter and diffuse into the container to make contact with the material. The pin-hole opening is provided at one end of the container and as time proceeds, the color proceeds toward the other unexposed end of the container.

U.S. Pat. No. 3,078,182 to Croner Jr., describes a heat-sensing, color-changing, adhesive tape for a device to be sterilized in a hospital autoclave including an adhesive layer for attachment, a backing web over the adhesive layer and a visible colored layer over the backing web wherein the colored layer comprises a selective pigment dispersed in a resin binder.

U.S. Pat. No. 3,480,402 to Jackson, describes a time indicator formed of an absorbent carrier having absorbed thereon at least one chemical compound which changes color upon exposure to oxygen. The carrier and chemical compound absorbed thereon are protected from ambient oxygen by a non-perforated barrier layer which is transparent and through which atmospheric oxygen can controllably diffuse over a preselected period of time. Thus, when the chemical compound changes color, the preselected period of time is indicated. The graduated time indicator may be produced by utilizing more than one chemical or a layer covering the various pieces of absorbent material of different thickness. For each piece of absorbent material, the chemical absorbed on the piece of absorbent material would change color at different times, e.g., the chemical on one piece would change color after, say, one week, and the chemical absorbed on another piece would change color after ten days, and the chemical on a further piece of absorbent material would change color after fourteen days. Thus, a graduated time indicator is described.

U.S. Pat. No. 3,520,124 to Myers, describes a parked car time indicator including a first sheet having a first reactant and a second sheet having a second reactant and a release sheet which is peeled away to permit contact of the first sheet with the second sheet to start a reaction over a selective time interval terminating with a color change of the reactants.

U.S. Pat. Nos. 3,954,011 and 3,962,920 to Manske, describes a time indicating device suitable for visibly measuring parameters such as time, temperature and time-temperature relationships. The device includes a porous fluid-carrying pad, a wick material for the fluid and an indicator means whereby the progress of fluid along the wick material can be visibly indicated and used to measure the passage of time, the exposure to a given minimum temperature or time-temperature relationship.

U.S. Pat. No. 3,999,946 to Patel, describes a perishable product time-temperature history indicator including a substrate for attachment to the product showing changes in temperatures along a y-coordinate over periods of time along an x-coordinate.

U.S. Pat. No. 4,028,876 to Delatorre describes an apparatus for visually indicating elapsed time by a color change which comprises a transparent container having a rupturable capsule therein and in which a first composition is contained. A transparent matrix surrounds the second composition which is also in the container. The device may be secured to a surface by means of a mechanical fastener or an adhesive layer.

U.S. Pat. No. 4,229,813 to Lilly, et al describes a time indicator which utilizes a silicon oil which is slowly absorbed onto and moves up a porous strip at a rate which is a function of time. One side of the strip is printed with an oil soluble ink, while the other side is unprinted. The printed side of the strip is laminated with polyethylene film to an unprinted strip. As the silicon oil moves up the strip, the oil contacts the ink causing a dye in the ink to migrate from the printed side to the unprinted side, thus providing a measurable color front moving up the strip.

U.S. Pat. No. 4,382,700 to Youngren describes an indicator which contains a mineral jelly which is in contact with a wick, such that the mineral jelly diffuses into the paper in accordance with the changes in ambient temperature over a period of time.

U.S. Pat. No. 4,408,557 to Bradley, et al describes a timer comprising an absorptive layer disposed on a base layer which accepts a carrier mixture at a predetermined rate. A barrier means is disposed between the carrier mixture and the absorptive layer, and the removal of the barrier activates the timer.

U.S. Pat. No. 4,629,330 to Nichols describes a color change indicator which includes a liquid which evaporates over a period of time and has a predetermined index of refraction, a reservoir for holding the liquid, and an opacifying layer of microporous material. The microporous layer has an index of refraction approximately the same as that of a liquid, overlies the reservoir and has an open cell network of pores for absorbing liquid from the reservoir. The layer is one color when the liquid occupies the layer, and a second color when the liquid is depleted from the layer.

U.S. Pat. No. 4,643,122 to Seybold, describes a tamper-indicating security tag including a carrier material impregnated with a solution of a selective compound with a solvent for use in a sealed enveloping container which controls the rate of diffusion of the solvent.

U.S. Pat. No. 4,646,066 to Baughman, describes an environmental exposure indicator device. The device includes a target made of a tuned circuit, a selective element which receives an interrogation signal in the radio or microwave frequency range and an antenna which receives and converts the signal to an electrical current. The selective element has an electrical property that changes in response to an environmental exposure, such as temperature, combined time-temperature, humidity, radiation, a particular fluid, or mechanical shock.

U.S. Pat. No. 4,737,463 to Bhattacharjiee, describes a photoactivatable time-temperature indicator comprising a mixture of a thermally unreactive diacetylenic compound and a photosensitive compound that, on exposure to actinic radiation, forms an acid that converts the diacetylene to a thermally reactive product.

One of the problems associated with all of the foregoing devices, aside from the problems discussed relating to the Kydonieus et al and Haas patent, is that they are complicated to adjust for a selected period of time. Adjustment often involves experimentation with many types of chemicals, inks, solvents, wicks, etc. to prepare a device which can operate under the conditions expected. Additionally, very few of these devices can indicate the relative length of time that has elapsed since the device was activated, i.e., it is difficult to determine what fraction of the selected period of time has elapsed. Most of the prior art devices gradually change color over a period of time and involve, at best, a guess on how much time has elapsed. When this is combined with the possible variations in temperature, humidity, etc.

that may exist in the environment of the time indicator, the viewer has very little confidence that he is close to the expiration time of the device.

A need thus exists for an indicator which is inexpensive, simple to construct and can clearly, relatively accurately and quickly indicate the lapse of progressive selected periods of time increments. Also, a requirement exists for the developed on self-appearing image to remain clean and ledgable for long periods of time, i.e. months or years, at ambient and elevated temperatures such as 150 degrees fahrenheit. The present invention satisfies this longevity requirement.

Also, there is a need for indicators which provide information upon the passage of discrete time intervals.

Further, there is a need for self-expiring or self-canceling tickets to prevent reuse and counterfeiting. Still further, there is a need for a means for easily adjusting the selected period of time without cumbersome trial and error methods.

In a related aspect of this inventions, there is also a need for maintaining the security of sealed packages. Enormous sums are lost each year by industry from theft occurring during transportation of goods in packages. Thieves simply open the packages in which goods are transported, remove goods, and reseal the packages. The unwary purchaser is thereby victimized. There is thus a need for tamper indicating security means which requires merely a brief visual inspection of the package in which the goods are transported to determine whether the package has been tampered with.

OBJECTS AND SUMMARY OF THE INVENTION

It is an object of this invention to provide a time indicator which provides a clear indication of expiration which also remains visible for long periods of time.

It is a further object of this invention to provide a time indicator badge which provides a relatively clear indication of expiration over a relatively short period of time and is simple in construction.

It is still a further object of this invention to provide a time indicator device which can provide the user with a clear indication of the increments of time that have elapsed since activation of the device.

It is yet another object of this invention to provide a time indicator device wherein the means for adjusting the selected period of time of the device can be easily and simply adjusted.

It is still a further object of this invention to provide a self-expiring parking permit which enables a parking attendant to determine from a relatively long distance whether the parking permit has expired.

It is yet another object of this invention to provide a parking time indicator which can function inside a sealed vehicle which experiences large variations of temperature and can indicate the relative elapsed time.

It is still another object of this invention to provide a parking time indicator which is disposable, can be transferred from one vehicle to another and is relatively inexpensive.

It is a further object of this invention to provide a parking time indicator which can be customized for the particular needs of the parking lot, and wherein the possibility of duplication or counterfeiting is minimized.

It is another object of this invention to provide self-expiring transportation tickets, passes and transfers, including admission tickets for parks, theater and other events which expire upon the passing of set intervals, including one day tickets, one week tickets, one month tickets and tickets of other time intervals.

It is a further object of this invention to provide a patterned indicator on continuously changing ticket which is not easily counterfeited.

It is still another object of this invention to provide a wrist band ticket which self-expires wherein the wrist band ticket wraps around the wrist of a person to prevent the transfer of the ticket.

It is even another object of this invention to provide a warning label or sign which the warning message self-expires or disappears after a specified interval of time.

It is yet another object of this invention to provide self-expiring security tape for use in customs and checked baggage facilities wherein the security tape self-expires after set intervals to prevent reissue thereof.

It is yet another object of this invention to provide a self-changing retail sticker wherein a sticker is applied to purchased goods at the point of purchase and the sticker self-expires to prevent the purchaser from reusing the sticker at another time.

It is still a further object of this invention to provide a shelf life indicator which is applied to products having shelf lives wherein the indicator changes color or words develop after specified intervals of time corresponding to the shelf life of the particular product.

It is yet a further object of this invention to provide a product age indicator wherein the indicator is applied to products prior to transportation, and the indicator changes with time to show the relative age of the product so that older products may be sold prior to new products.

It is still another object of this invention to provide a label for use with pharmaceutical products which self-expires upon reaching the end of the useful life of the product.

It is even another object of this invention to provide a price tag which, after a time interval, changes to indicate a reduced price.

It is even a further object of this invention to provide a game wherein answers or solutions to questions or problems become visible after the passage of a time interval.

Yet another object of this invention is to provide an advertising or promotional product wherein latent information becomes visible after a specified interval of time.

It is even a further object of this invention to provide an indicator which indicates that service is required after the passage of an interval of time, for use in such applications as changing oil, changing lubricants, changing water, etc.

It is yet a further object of this invention to provide an indicator which, after the passage of an interval of time, indicates that a product should be replaced, e.g., an air filter, a water filter, batteries, etc.

It is still a further object of this inventions to provide a time indicator for accurately indicating the passage of long periods of time, including months and even years.

It is yet another object of this invention to provide a visitor pass having a void pattern printed faintly thereon, which, after activation, grows dark to indicate expiration of the pass.

It is even a further object to provide a patterned indicator for indicating tampering with a package wherein such indication is not evident to the tamperer.

It is still a further object of this invention to provide a tamper indicating packaging tape which indicates that a package has been tampered with when water, an organic solvent or heat is applied to the packaging tape, or when the packaging tape is cut and resealed with a clear adhesive tape.

The foregoing and other objects, features and advantages will be apparent from the following description of the preferred embodiments of the invention as illustrated in the accompanying drawings.

One particular embodiment of this invention is a time indicator which comprises a two-layer front part and a two-layer rear part. The rear part has overlaying each other (1) an ink pattern layer and (2) a rear support member. The front part has, overlaying each other, (1) a transparent front support layer and (2) an opaque adhesive layer having a front ink display surface, the adhesive layer capable of dissolving the ink pattern on the rear part.

Upon issuance of the indicator, for example in the form of a badge, a release sheet is peeled off the front part and the front part is overlaid and pressed down upon the rear part, with the adhesive layer and the ink layer and rear support member forming an assembly joint between the front and rear parts. This causes the adhesive layer and ink on the rear support member to come in contact with each other, with the adhesive dissolving the ink at the interface between the ink and adhesive. The ink then migrates from the ink layer through the adhesive to the front ink display surface of the adhesive layer, where it forms a contrasting pattern against the opaque adhesive layer, e.g. an expiration notice, words, diagonal voiding bars, after a predetermined period of time, whereby it can be viewed through the transparent front support layer.

Another embodiment of this invention is a patterned indicator comprising a pattern which, upon application of a stimulus or an activator contained in the opaque adhesive layer, reveals latent information. Preferably, the pattern is a uniform array of ink dots printed on a substrate. The latent information may be a function of the type ink used for various dots in the array, may be a function of a mask placed over the substrate, or may be a function of an application of a patterned activator in the opaque adhesive layer. Preferably, the activator is contained in the opaque adhesive layer which is on a transparent overlaying film and functions to solubilize the ink pattern, the ink migrating through the adhesive layer to the front ink display surface of the adhesive layer.

A preferred embodiment of this invention is a self-expiring parking permit comprising a substrate of a construction that allows it to be hung from a rearview mirror, a pattern comprising a migrating ink and non-migrating ink printed on the substrate containing latent information, and a transparent film having an opaque adhesive layer. At the time of issuance of the permit, the transparent film is adhered to the substrate such that the adhesive surface contacts the ink patterns on the substrate and causes, over a specified time interval, the migrating ink to migrate through the opaque adhesive layer and coalesce on the front ink display surface of the adhesive layer to reveal the latent information contained within the pattern. Thus, the permit self-expires.

In another preferred embodiment, the patterned indicator is a visitor's pass wherein numbers appear sequentially corresponding to passing time intervals.

In still another embodiment, the patterned indicator is a self-voiding bar code having a background pattern, which, after activation coalesces so that the bar code is no longer distinguishable.

In still another embodiment, the patterned indicator is a dynamic ticket which self-voids after the passage of a time interval.

In yet another embodiment, the patterned indicator is a wrist band ticket which self-expires after the passage of a time interval.

In yet another embodiment, the patterned indicator is a warning label or sign on which the warning message self-expires or disappears after the passage of a time interval.

Other preferred embodiments include:

- a self-expiring retail sticker applied to goods after a sale to indicate that the goods are sold, but which, upon expiration, is incapable of subsequent deceitful use;
- a self-expiring pharmaceutical label on which, after the passage of a time interval corresponding to the life of the pharmaceutical, the label indicates expiration;
- a dynamic price indicator label which initially shows one price, but after the passage of a time interval, cancels the original price and shows a reduced price; and
- a patterned indicator for notification of something that needs to be done after the passage of a time interval.

DESCRIPTION OF THE PREFERRED EMBODIMENT

Figure 1:
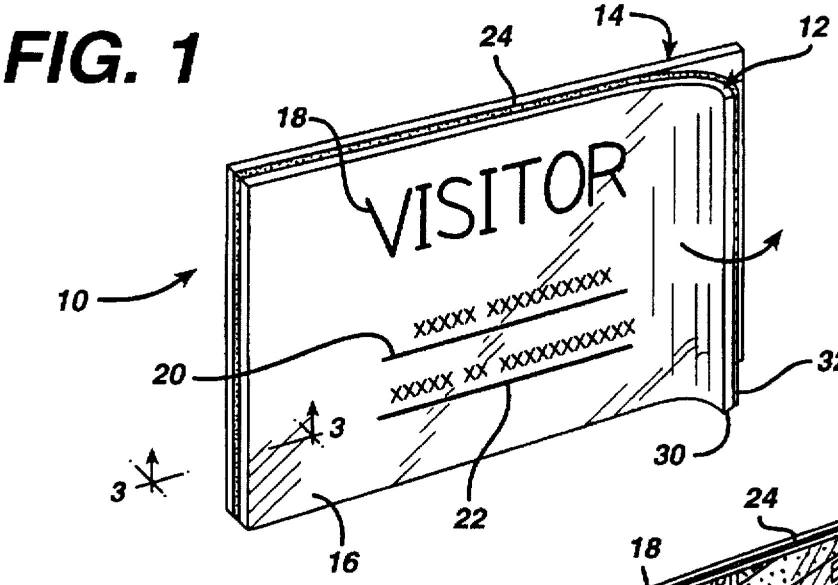
FIG. 1 is a perspective view of a time indicator badge according to the present invention.

As shown in FIG. 1, a time indicator badge 10 is provided. Badge 10 is assembled by a security person, and is delivered to a visitor to a facility, and expires after a specific time interval.

Figure 3:
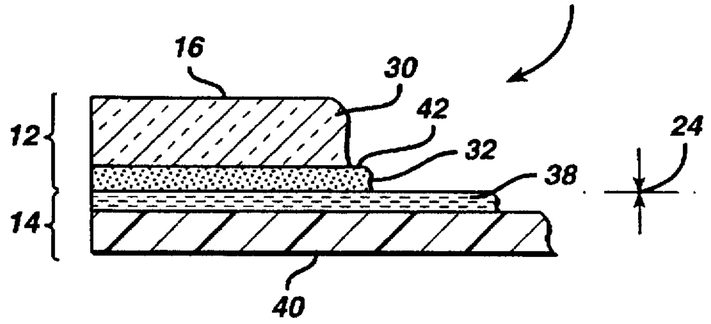
FIG. 3 is a partial section view as taken along the line 3—3 of FIG. 1.

Broadly, the time-dependent badge 10 of this invention uses the principal of migrating ink. Referring to FIGS. 1 and 3, the badge 10 is made of two parts (12 and 14), the front part 12 being the face of the badge or credential and the back portion 14 having stripes printed with a special ink 38 that migrates through the opaque adhesive layer 32 to be viewed through the transparent front support layer 30 of the front part 12. Thus, when the badge 18 is issued, the self-adhesive face or front portion 12 is placed over the back part 14 and the timing process begins. The ink 38 passes or migrates through the opaque adhesive layer 32 of the front part 12 in approximately the predetermined time period whereupon the printed stripes become visible through the transparent front support layer 30, thus alerting the guard to check the actual date written on the badge.

Figure 2:
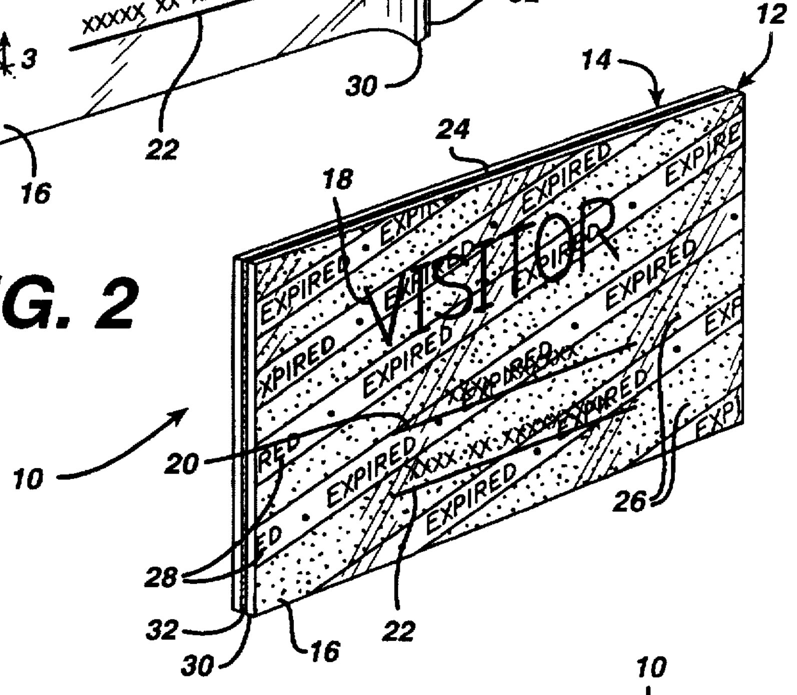
FIG. 2 is a perspective view corresponding to FIG. 1 of the time indicator badge, after expiration thereof.

More particularly, referring to FIGS. 2 and 3, badge 10 has a front indicator portion 12 and a rear reservoir portion 14. Front part 12 has a front print display surface 16. The print display surface has the word "VISITOR" imprinted thereon 18, and has a visitor name line 20 whereon the security person can write the name of the visitor. The badge also has a company name line 22 whereon the security person can write the name of the visitor's company. The security person then joins the front part 12 to the rear part 14 forming an assembly joint or construction line 24.

As shown in FIG. 2, after the time interval has elapsed, badge 10 has a plurality of diagonal voiding bars 26 and a plurality of "EXPIRED" notice words 28 displayed through the print display surface 16 of the transparent front support layer 30. The information printed on the rear support member 40 can be camouflaged or hidden by additional printing with the same or different colored inks which are non-migrating inks, i.e. can not migrate through the adhesive layer 38, to obscure the true information content of the migrating ink pattern.

As shown in FIG. 3, front part 12 has overlying each other a transparent front support layer or clear plastic sheet 30, an opaque adhesive layer 32 having a front ink display surface 42. The adhesive layer 32 is preferably white and contrasts with the color of the ink 38 and is capable of dissolving the ink 38 or contains an ink dissolver. Transparent layer 30 is a clean or translucent external support layer which is composed of an acetate film or polyester film of, for example 2 mil thickness. The opaque adhesive layer 32 is supported by transparent layer 30 and has a relatively thin thickness of about 0.0005 to 0.0020 inches, and acts not only as an adhesive layer, but as an optical barrier and contrasting background for displaying ink letters 28 and ink bars 26. Preferably, the ink or dye has a red color. Preferably, a rubber or acrylic based pressure sensitive adhesive is used with an "opaqueing agent", for example titanium dioxide, dissolved in the adhesive in, for example, concentrations of from about 1% to about 40%. Colored pigments can also be added to the adhesive to make it any desired color.

The adhesive formulation depends, to a large degree, on the thickness of the adhesive layer. For example, a thin adhesive layer will require a higher concentration of opaqueing agent than a relatively thicker adhesive layer in order to adequately hide the underlying ink pattern. Further, the rate of absorption of the inks can be greatly enhanced by adding a variety of liquid organics to the adhesive to thereby decrease the time required for the ink to migrate to the ink display surface. Still further, depending on the specific organic the rate of image development can be enhanced by a hundred-fold. A plasticizer, for example, may be used to provide the aforesaid enhancements.

Figure 4:
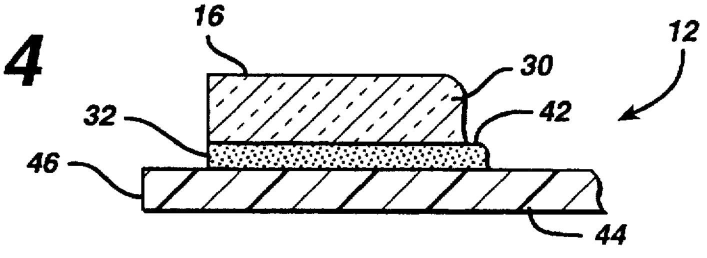
FIG. 4 is a partial section view of a first embodiment corresponding to the front portion of FIG. 3, before assembly thereof.

Still referring to FIGS. 3 and 4, rear part 14 has a migrating ink patterned film or layer 38 and has a support card 40. Ink layer 38 is loosened and dissolved by the opaque adhesive layer 32 after front part 12 is joined to rear part 14 along assembly joint 24. Ink patterned layer 38 is dissolved and then travels or migrates through layer 32 to an ink display surface 42.

Preferably, before assembly thereof, a release paper 44 is provided which overlies the adhesive layer 32. The release paper 44 is peeled away from layer 32 by gripping an over-hang portion 46 between two fingers, and by gradually peeling the release paper away from layer 32. Thereafter, front part 12 is aligned along its edges with rear part 14 (see FIG. 1) and front part 12 is pressed down on rear part 14, whereby the assembly of badge 10 is completed as shown in FIG. 3.

When badge 10 is issued, the self-adhesive front part 12 is placed over rear part 14 and the time process begins. In this embodiment, badge 10 is a one-day badge and has a length of about three inches and width of about two inches and a thickness of less than one-eighth inches. To issue badge 10, the desired data is filled in on front surface 16, the release paper is peeled off, and front part 12 is placed over rear part 14. The red indicator bars 26 and expiration words 28 appear after expiration of the approximate time period.

Layer 32, which is supported by transparent layer 30, has a minimal thickness, thereby providing a relatively short travel path for ink patterned film 38 to ink display surface 42. Ink patterned film 38, which has a relatively dark red color, does not become appreciably pink due to this relatively short path.

Transparent layer 30, which is a clear inert acetate film, has a selected thickness. Layer 30 provides mechanical support and rigidity, and supports layer 32. Layer 30 permits adhesive layer 32 to be as thin as desired. Adhesive layer 32 is thin and opaque and permits the ink or dye to pass through it without substantial dispersion due to the ink's absorption into the film 32 causing lack of clarity.

Transparent layer 30 also prevents passage of foreign inks or dyes from entering into layer 30 through the front print surface 16 of layer 30. For example, if two badge samples are stored in an envelope with opposing front and back parts facing each other, a foreign ink or dye from the rear part of one badge will not pass through and damage the front part of the other badge as layer 30 prevents any passage therethrough.

Adhesive layer 32 adsorbs and concentrates the patterned ink on the front ink display surface 42 so that, for example, a relatively dark red color of ink is provided on a white background. Ink display layer 42 thereby provides a concentration function to achieve a relatively pure, non-diluted ink.

The varying time periods for the time dependent badges 10 are controlled by different face portions 12 of the badge 10. All time dependent badges may use the same migrating ink, permitting any of the various back portions 14 to be used with the different faces Associated with the aforedescribed time indicator is that after the image appears at the front surface of the opaque adhesive layer the ink proceeds to diffuse laterally along the ink display surface 42 and the image becomes illegible. In fact, the faster the ink image appears, i.e. migrates through the adhesive layer, because of the solubility characteristics of the dye or ink in the adhesive layer, the faster the image blurs and becomes illegible. The embodiments of the invention described below tend to minimize or eliminate this problem.

Figure 5:
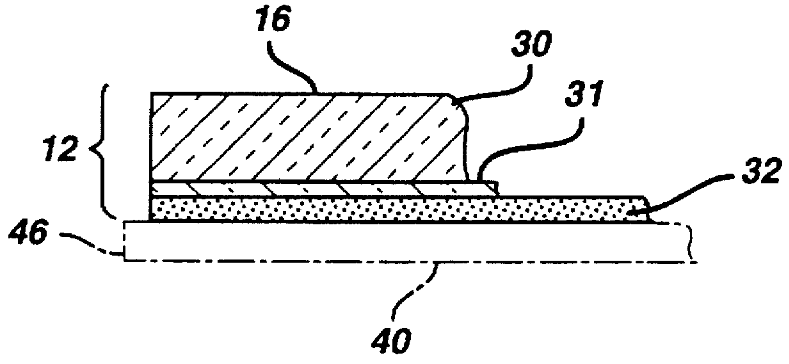
FIG. 5 is a partial section view of a second embodiment of the front portion of FIG. 3, before assembly thereof.

FIG. 5 is a partial section view of a second embodiment of the front portion of FIG. 3, before assembly thereof. This embodiment has added to the embodiment depicted in FIG. 4, a transparent film or absorbing layer 31 in front of the opaque adhesive layer 32. The ink or dye passes through the opaque adhesive layer 32, becomes visible through the transparent front support 30 and transparent absorbing layer 31, and then proceeds to be absorbed into the absorbing layer 31. Such a structure reduces the ink concentration in the adhesive layer 32, which in turn reduces the lateral diffusion of the dye across the ink display surface 42, thus reducing the blurring of the image. Another benefit of the ink absorbing layer 31 is that as the ink concentration increases on the ink display surface 42 of the opaque adhesive layer 32 and is subsequently absorbed into absorbing layer 31, the ink color is enhanced since it is not diluted by the opaqueing agent in the adhesive layer 32. This causes the image to become deeper and darker in color, and even though the image in the adhesive layer 32 may blur, the darker and deeper ink color in the overlying absorbing layer 31 will not blur and will obliterate the underlying blurred image in the adhesive layer 32. This construction of the time indicator results in an image which remains legible much longer than a construction without the absorbing layer 31. It is possible that the solid absorbing material 31 could also be the front support material 30, this performs both functions with a single transparent material like vinyl or styrene.

Figure 6:
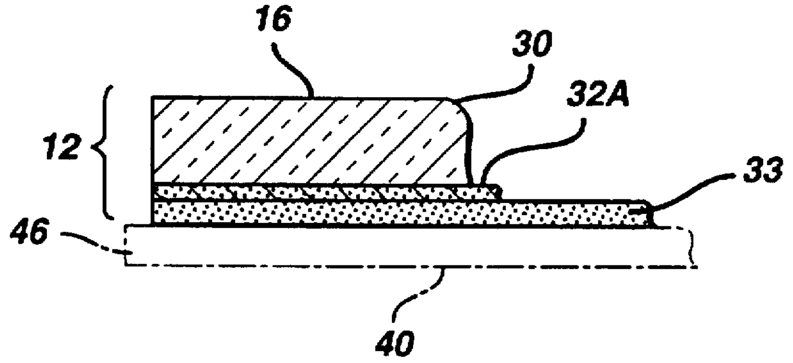
FIG. 6 is a partial section view of a third embodiment of the front portion of FIG. 3, before assembly thereof.

FIG. 6 is a partial section view of a third embodiment of the front portion of FIG. 3, before assembly thereof. Instead of using an opaque, e.g. solid white, adhesive layer applied to the transparent support film 30, a transparent adhesive layer 32A can be applied thereto and another very thin layer of opaque adhesive 33 can be applied over the transparent adhesive layer 32A. This produces a faster image development than the construction of Figure 4 because the opaque layer 33 can be very thin, thus concentrating the opaqueing agent in the opaque layer 33 which makes the initial contact with the migrating ink pattern.

This opaque layer or coating 33 can comprise a concentrated pigment or opaqueing agent in the same adhesive used for transparent adhesive layer 32A, or it can be pigment or opaqueing agent dissolved in a solvent or binder which is surface coated onto the exposed face of the transparent adhesive layer 32A. This coating or layer 33 can be very thin, e.g. 0.1 mil, vis-a-vis a thickness of 1 to 2 mils for the transparent adhesive layer Normally, an adhesive coating of at least about 1 mil is required to provide adequate adhesion of the front part to the rear part. Thus, with this construction, one can make a very thin opaque barrier that causes the image to appear rapidly while still producing a usable thick adhesive construction.

Figure 7:
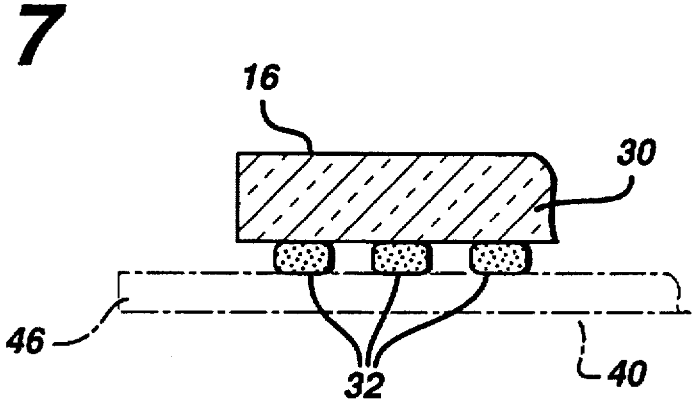
FIG. 7 is a partial section view of fourth embodiment of the front portion of FIG. 3, before assembly thereof.

FIG. 7 is a partial section view of fourth embodiment of the front portion of FIG. 3, before assembly thereof. This embodiment of construction completely eliminate or at the very least minimizes the blurring or loss of image after it appears. In accelerated tests wherein the indicator was heated to 150 Degrees Fahrenheit for several days, this type of construction resulted in the image remaining unaltered and substantially permanent. Using any of the aforedescribed constructions, i.e. FIGS. 4–6, above one can coat the adhesive layer 32 as a dot pattern vis-a-vis a coating, i.e. a continuous layer of adhesive. When each dot of adhesive comes into contact with the migrating ink, it absorbs the ink and turns dark. However, none of the ink within this dot of adhesive is transmitted to any other dot of adhesive because they are not touching, and the ink cannot pass along the surface of the transparent front support film 30. Since the dots not in direct contact with the migrating ink can not absorb any ink from adjacent dots which are in direct contact with the ink, they remain completely white, whereas the dots that are touching the migrating ink become completely darkened by the ink thereby producing a sharper image through the transparent front support layer 30. Furthermore, the amount of organic solvent that can be added to the adhesive can be greatly increased over that used in a continuous coating of adhesive, the dot configuration minimizing any increased lateral dispersion which increased amounts of organic solvent would tend to bring about.

The embodiment depicted in FIG. 7 is very useful in time indicators wherein the predetermined time for exposure is relatively long, e.g. 90 days. In order to keep the developed image legible, the lateral diffusion of the dye must be controlled over such a long period of time. This is almost impossible with a continuous adhesive layer. When the adhesive layer is made discontinuous by printing it as a dot pattern, all lateral diffusion is eliminated.

Fine dot patterns of adhesive may be printed as standard procedures in gravure printing. Such dot patterns can also be silk screened by rotary high speed silk screen units. Such procedures are well known in the art.

An example of such an embodiment of the front part of a time indicator is to gravure print a pattern of opaque, white adhesive, say 60 dots/inch, with a 50% coverage (50% tint) onto a clear, transparent 2 mil polyester support film. The polyester film will look completely white, but yet be appropriately segmented to prevent lateral dispersion.

The embodiment of FIG. 7 may also be utilized to advantage for a time indicator having a predetermined time for the image formation of from 10–30 seconds. This can be accomplished by printing the dots very thin, say 0.0001" drythickness, and printing the migrating ink in the desired pattern to "select" which dots will reproduce the image.

It should be noted that the primary reason for using opaque adhesives instead of clear adhesives in the aforedescribed constructions is to provide a contrasting surface for the ink to produce an image thereon. Thus, a white adhesive forms the background for colored ink that passes through the adhesive to show itself on the front surface. It is possible to use clear adhesives and in those portions where the dye is absorbed to produce the image, provided the ink coats with the adhesive to change the optical characteristics of the adhesive or clear support film so that the image produced contrasts sharply with the background ink pattern. Optionally, a mixture of dyes can be used in the migrating ink, the adhesive only absorbing one of the dyes from the mixture to thus produce a contrasting color from that printed on the back part, in the form of the desired image. For example, one may print an image onto the rear support member using an ink which is pink which is made of red dye and white pigment (Ti02). When the transparent adhesive layer is placed in contact with the ink, only the red dye is absorbed producing a contrasting color against the pink background on the rear support member.

Thus, in summary, the advantages of badge 10 are:

(a) A relatively dark display ink color is provided and such color becomes darker as the time interval progresses, because the adhesive display layer 32 receives a relatively high concentration of the ink.

(b) A sharper time window and more accurate expiration time is provided because of the unique adhesive layer 32 serving multiple functions. When front part 12 and rear part 14 are assembled, the ink from ink layer 38 dissolves into the adhesive within a few hours. Subsequently, when the ink migrates to the front ink display surface 42 of the opaque adhesive layer 32, the ink color rapidly increases. In this way, a relatively long latent period exists after parts 12, 14 are assembled, followed by a relatively fast appearance of ink color, thereby providing a clearly defined expiration time.

(c) The final color of the ink is relatively dark because all of the ink is concentrated in the front ink display surface 42 of adhesive layer (d) Because layer 32 is relatively thin, the badge timing control is the activity of the adhesive and ink dissolver in layer 32. The time interval of badge 10, which is from start time to expiration time, is set by merely adjusting the thickness and chemical composition of adhesive layer (e) The white background of badge 10 remains white for a relatively longer percentage of the time interval, and the ink color of badge 10 is relatively darker after expiration, and the ink color dilution in badge 10 is minimized, as compared to that of the prior art time indicators.

(f) Badge 10 does not absorb foreign ink or the like through its front surface 16 and does not permit loss of ink therethrough.

(g) The colored image that is produced will remain for long periods of time such as weeks, months and even years.

DESCRIPTION OF OTHER EMBODIMENTS

The time indicator of this invention may be incorporated into a variety of other timing indicators, as well as security badges. Such timing indicators could be used for indicating service time intervals, warning time intervals, reminder time intervals, voiding documents after a prescribed time, food and biological timing indicators, and the like. This invention provides for an accurate and practical color changing indicator.

In another preferred embodiment, the ink pattern comprises an array of ink dots. Hidden within the array of dots is latent information. The latent information may result from printing the dots in different inks, some dots being dissolvable or migrating and some being inert. In other embodiments, the array is printed only with one dissolvable ink but is masked with an inert film, the latent information thereby being a function of the pattern formed by the inert film. The latent information is brought forth from the pattern through, in many embodiments, the application of any one of the aforedescribed opaque adhesive layers. Typically, contact with the adhesive surface of the film causes the ink dots to dissolve, migrate and coalesce.

The patterned indicator of the present invention has a number of highly preferred embodiments. Many, but not all, of these embodiments are depicted in FIGS. 8–35.

Figure 8:
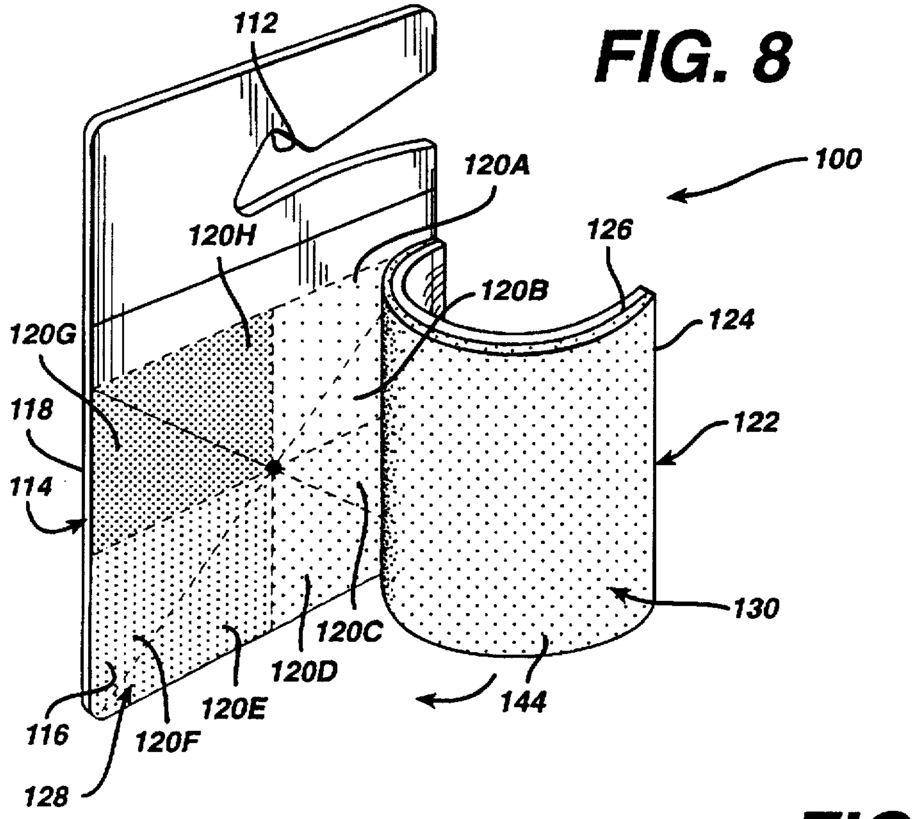
FIG. 8 is a perspective view of the parking time indicator of this invention being activated by applying a transparent substrate having an opaque adhesive layer thereon over the printed substrate.
Figure 9:
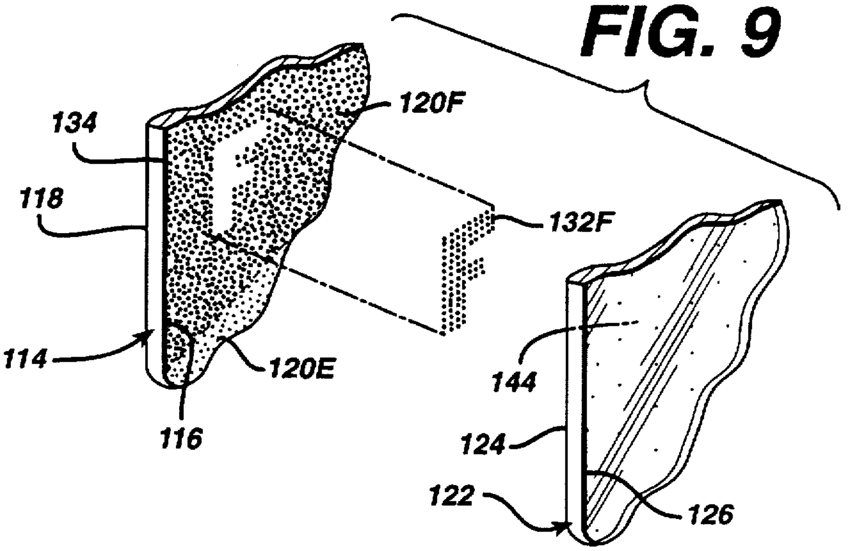
FIG. 9 is an exploded perspective view of a portion of the time indicator of FIG. 8 showing the first substrate, the dot pattern printing thereon, and the overlaying transparent substrate having an opaque adhesive layer thereon.
Figure 10:
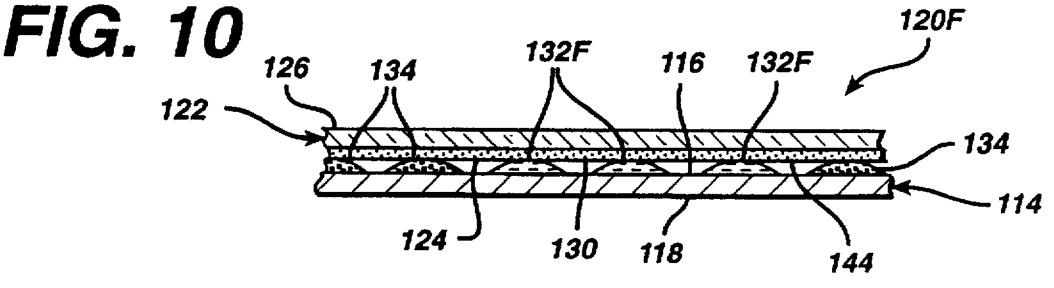
FIG. 10 is a schematic cross-sectional view of the time indicator of FIG. 8.
Figure 11:
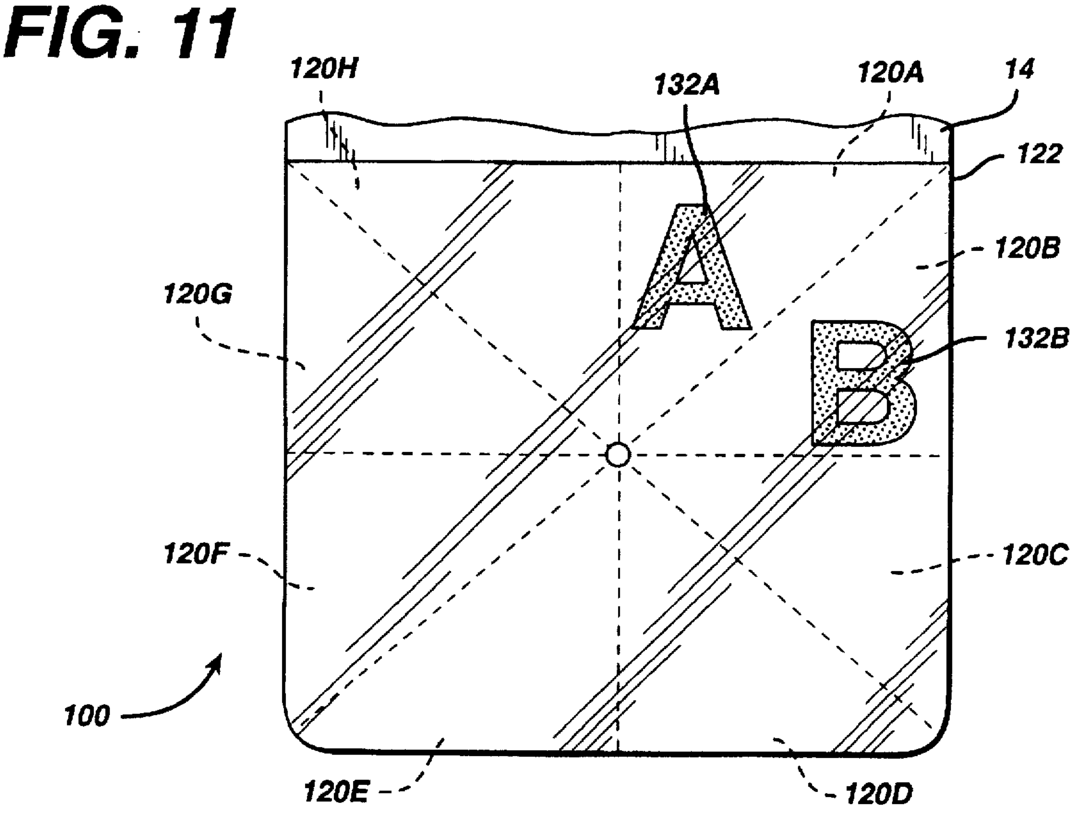
FIG. 11 is a partial front view of the time indicator of FIG. 8, shortly after activation.
Figure 12:
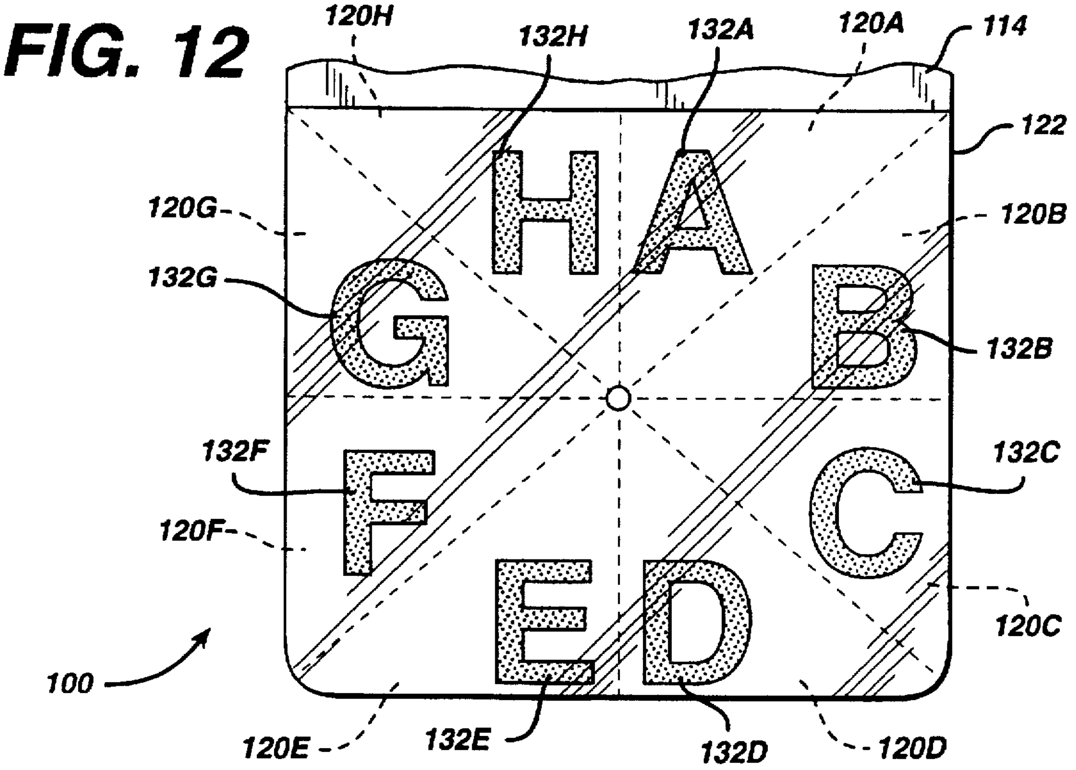
FIG. 12 is a partial front view of the time indicator of FIG. 8, after a longer period of time has elapsed.

The embodiment of this invention depicted in FIGS. 8–14 comprises a rectangular parking permit or parking time indicator, generally designated 100, which may be conveniently hung from, for example, the rearview mirror of the car by slot 112 therein. Referring to FIGS. 8–10, the indicator 100 is comprised of a first substrate 114 which has first and second surfaces 116, 118. Substrate 114 may be made of cardboard, plastic, or any other material suitable for its intended use. Substrate 114 has thereon at least two indicia areas on the first surface. This invention, however, contemplates any number of indicia areas. As shown in FIGS. 8, 11 and 12, the parking permit depicted has eight adjacent triangular indicia areas 12OA–120H arranged in a clockwise pattern. Each indicia area is designed to indicate the passage of approximately an hour of time.

Still referring to FIGS. 8–10, a second substrate 122 is provided which has first and second surfaces 124, 126. In general, a first chemical agent 128, e.g. ink pattern, is applied on each indicia area and a second chemical agent 130, i.e. the opaque adhesive layer, is applied on the first surface 124 of the second substrate 122. When the first surfaces 116, 124 of each substrate 114, 122 overlay and are in contact with each other, the first and second chemical agents 128, 130, i.e. opaque adhesive layers, coact to cause a visually perceptible change at one of the second surfaces 126 overlaying the first indicia area, e.g. 120A, in a first selected time interval, e.g. one hour, and a visually perceptible change in the second surface 126 overlaying the second indicia area 120B in a second selected time interval, e.g. two hours, the first selected time interval differing from the second selected time interval.

In the parking permit depicted in FIGS. 8–14, there are eight indicia areas 120A–120H. Each indicia area changes, sequentially, in a clockwise pattern, to depict the letters A, B, C, D, E, F, G and H, for example, an hour after the previous indicia area has depicted its respective letter. In effect the selected time interval for indicia 120A is one hour, 120B is two hours, 120C is three hours, etc.

In the preferred embodiments depicted herein the second substrate 122 is transparent and has thereon any one of the aforedescribed opaque adhesive layers.

Referring to FIGS. 8–14, an ink pattern is provided on each of the indicia areas 120A–120H. This ink pattern may be a pattern of dots 132A–132H printed in a preselected pattern in each of the indicia areas. The use of the term "dot" includes not only the usual meaning of the word dot, i.e., a small round point, but also other type small points of ink print, for example triangular, heart shaped, etc.

Figure 15:
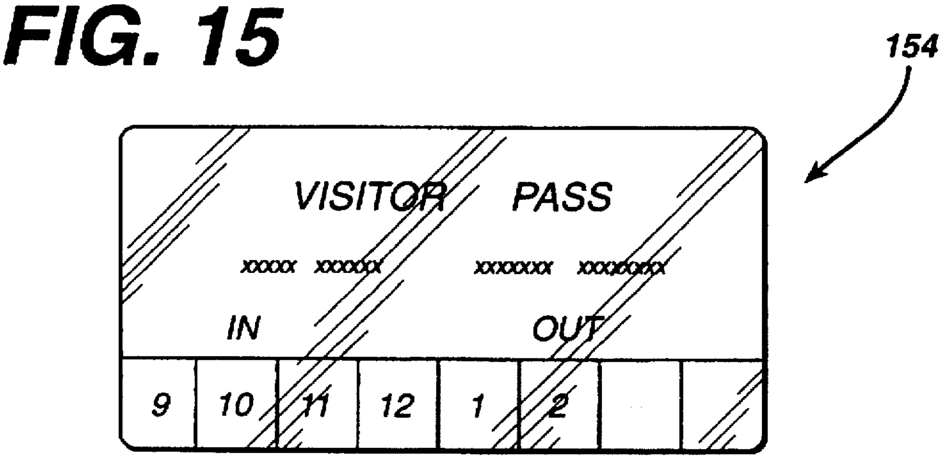
FIG. 15 is a front view of another embodiment of the time indicator of the invention.
Figure 16:
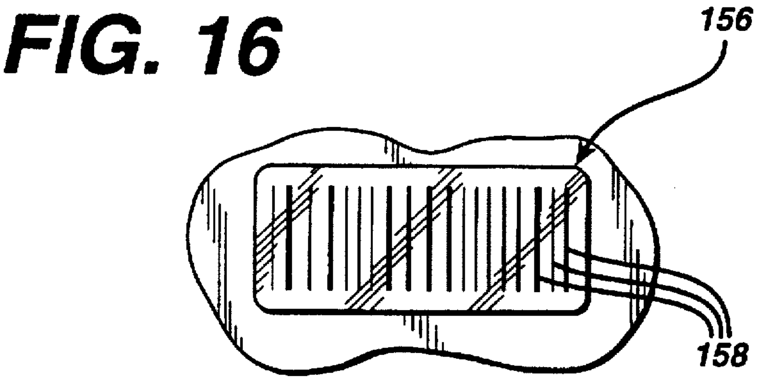
FIG. 16 is a fragmentary view of a bar code time indicator of this invention shortly after activation.
Figure 17:
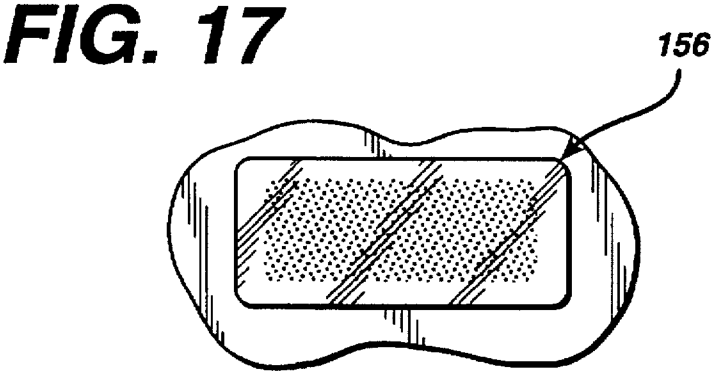
FIG. 17 is a fragmentary view of the bar code time indicator of FIG. 16 after expiration.

As indicated in FIG. 12, the ink pattern is an A, B, C, D, E, F, G and H, it may also be a number indicating time, e.g. 10, 11, etc., as shown in FIG. 15 and it may also be a series of bars producing a bar code, or as shown in FIG. 16–17 the cancelling of a bar code upon expiration of a predetermined time period.

As shown in FIG. 9 and FIG. 10, the indicia 120F may have an ink pattern 132F which is surrounded by a pattern of background dots 134, preferably of the same color as ink pattern 132F, which do not develop or change over a period of time. Ink pattern 132F is preferably a soluble ink pattern which, when placed in contact with the adhesive 144 which includes a solvent for the soluble ink, dissolves the dots so that the dots of the pattern bleed into each other. The background dots 134 are printed with an insoluble ink and thus they do not bleed together when in contact with the adhesive.

In general, it is the combination or coaction of the ink and opaque adhesive layer 128, 130 that produces the indication of time and this may be accomplished by either varying the ink, adhesive layer and/or pattern on the front substrate 122 and/or on the back substrate 114. Thus, this invention also contemplates that the opaque adhesive layer 130 on the front substrate 122 may be printed in such a manner that it dissolves only portions of the dot pattern imprinted on back substrate 114.

Figure 13:
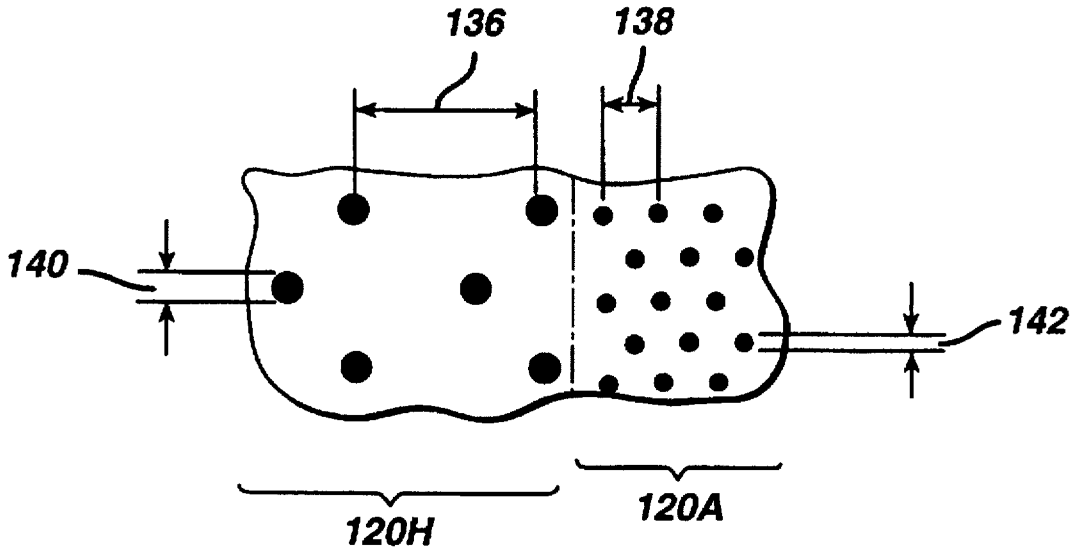
FIG. 13 is an enlarged detailed view of the time indicator of FIG. 8, showing the relationship, size and spacing of dots of the dot patterns.
Figure 14:
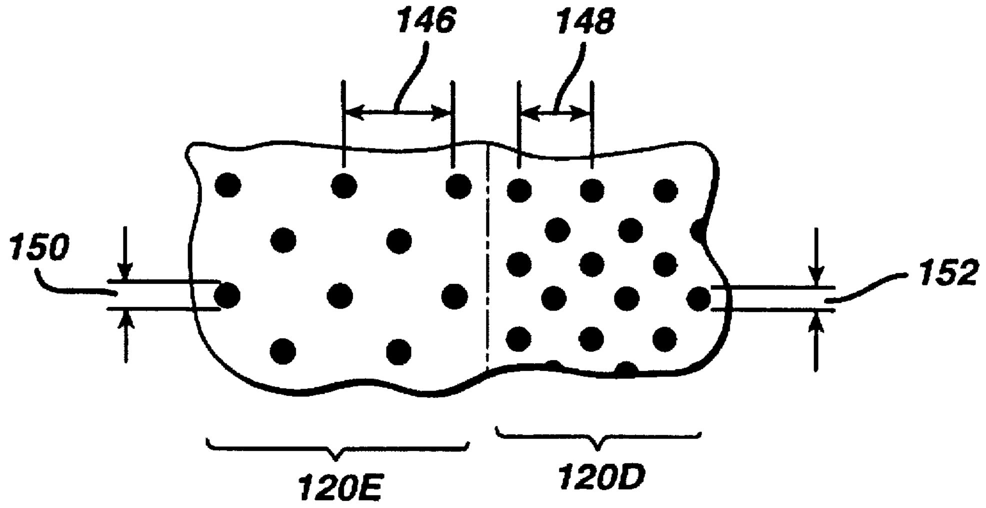
FIG. 14 is a view similar to FIG. 13, showing an alternate embodiment of the relationship, size and spacing of dots of the dot patterns.

An important aspect of this invention is that the use of a dot pattern imprinted on the first substrate makes it simple to vary the preselected time of development of each indicia area by varying the shape and size of the dots and/or varying the dot-to-dot linear dimension. This variation of shape and size and dot-to-dot linear dimensions is seen in a macroscopic view in FIGS. 8, 11 & 12 and on a relatively microscopic view in FIGS. 13 and 14. For example, referring to FIG. 13, depicting indicia area 120A adjacent to indicia area 120H, the dots in 20A are smaller and spaced closer together than 120H, i.e., the dot-to-dot distance 136 is greater than 38 and the dot diameter 140 is greater than 142. Alternatively, as shown in FIG. 14, depicting adjacent areas 120E and 120D, the dot-to-dot distance 146 is greater than 148 and the dot diameters 150, 152 are the same. Thus one can achieve varying preselected times by varying the geometric shape and size of the dots and/or the dot-to-dot distance. Depending on the application and times required, one can maintain the same geometric shape and size and vary the dot-to-dot distance of the patterns on indicia areas or keep the dot-to-dot linear distance the same and vary the geometric size and shape and/or vary both of these.

Referring to FIGS. 8–14, the indicia areas 120A–120H having dot patterns of different densities of colored migrating or soluble ink are printed on the permit in a clock face pattern. The dot "density" is most dense at the 112 to 1 o'clock indicia area 120A and progressively decreases in density in a clockwise manner.

In the preferred embodiment of the time indicator parking permit depicted in FIGS. 8–14, the first substrate 124 is made of cardboard or heavy paper which is cut to a shape that permits it to be hung from the rearview mirror of the vehicle, by, for example, slot 112. This type of attachment means insures that the permit is always in the same location in the vehicle independent of the type of vehicle and that the permit is not touching any surfaces, such as the windshield or the dashboard. The suspended permit experiences only ambient air temperature which is substantially cooler in summer and hotter in winter than the body or surface of the vehicle.

In use, the parking attendant issuing this parking permit 110 simply places the self-adhesive film 122 over the face of the printed substrate 114. This "activates" the indicator. As time passes, colored indicia develop, e.g. A, B, C, etc., beginning at, say 12 o'clock on the face and progress clockwise around the indicator as time progresses. A parking attendant can easily see which tags have expired and which are still valid simply by noting what most of the indicators show at the particular time he inspects the parking area.

Because the color change will be accelerated or suppressed depending on the ambient temperature, the parking attendant will use a relative comparison of all the tags in the area rather than any individual tag. This permits him to compensate for hot or cold days and thus use the same tag all year around. Of course, a substrate having a different composition of adhesive and/or a different printed substrate may be used to compensate for temperature.

Depending on the rate of dissolution of the migrating ink by the opaque adhesive layer on the cover film, the parking permits could be used for a few hours, a day, a week, etc. In each case the relative darkening of the indicator bands on the printed face of the parking tag would show the relative elapsed time since issuing the parking permit. The "clock" on the face of the permit can be seen from 10 to 20 feet away, darkened expired tags cannot be reused and it is difficult to print counterfeit permits.

Substrate 114 can be a continuous pin feed tag made of heavy paper stock, which may be computer-printed, written on directly by hand or left blank. To use, simply fill in the necessary information (expiration date, time, license number) and apply the activating cover 122 over the shaded clock. The clock will slowly become dark in stages showing expiration. Preferably there is a one-day and one-month activating cover. Such parking permits may be custom printed for use.

Based on the properties of the adhesive, dyes or inks and dot "density" used, the rate of color change or "dot growth" can be very accurately controlled. In all the embodiments depicted herein, all dots, i.e., the soluble and insoluble background dots, are printed with a black ink. Thus, anyone looking at the patterns cannot see the information contained in the soluble dotted array. This hidden or subliminal information is decoded, developed, or made visible by placing the second substrate over the dot pattern to cause the inks to behave differently. In this case the migrating ink begins to bleed into and through the opaque adhesive layer on the rear surface of the film, causing the dots to grow. As each dot grows and migrates to the front ink display surface of the adhesive layer the printing becomes darker and visible.

By using different dot patterns and dot densities, one can compensate for temperature variation so that different time-temperatures will show a progressive display pattern, while a specific time at only one temperature or within a limited temperature range will show a uniform and specific change with time only. Hence these can be true time indicators or time indicators which compensate for temperature variations or time temperature indicators.

FIG. 15 shows an embodiment of the time indicator of this invention in the form of a visitor pass 154. After activation of the pass by applying the front part comprising a transparent front support layer and any one of the aforedescribed embodiments of the opaque adhesive layer, the numbers 9, 10, 11, 12, etc. appear in sequence, indicating the hours elapsed since activation. As with the parking ticket, the latent information contained within the pattern may be a function of a coaction between soluble and insoluble inks, a mask having a pattern defined therein, or a patterned opaque adhesive on the underside of the transparent front film.

FIG. 16 and 17 show another embodiment of this invention in the form of a bar code 156, for example on a ticket. The bars 158 are imprinted, for example in a dot pattern and after activation by applying the front part comprising a transparent front support layer and any one of the aforedescribed embodiments of the opaque adhesive layer, the dots gradually bleed together indicating a void bar code. As with the parking ticket, the latent information containing within the pattern may be a function of a coaction between soluble and insoluble inks, a mask having a pattern described therethrough, or a patterned opaque adhesive on the underside of the transparent front film.

Figure 18:
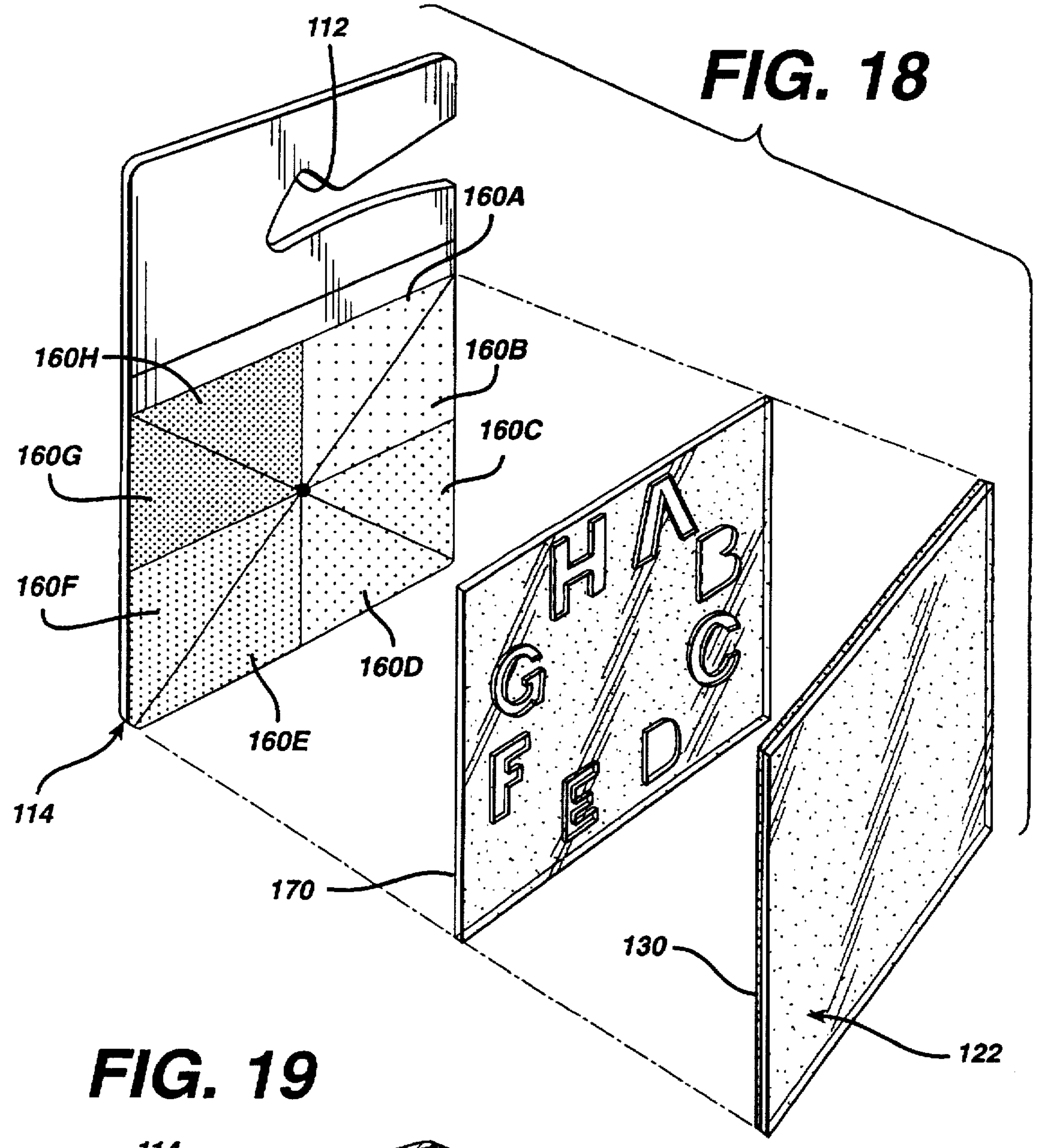
FIG. 18 is a perspective view of an alternative embodiment of the parking time permit.
Figure 19:
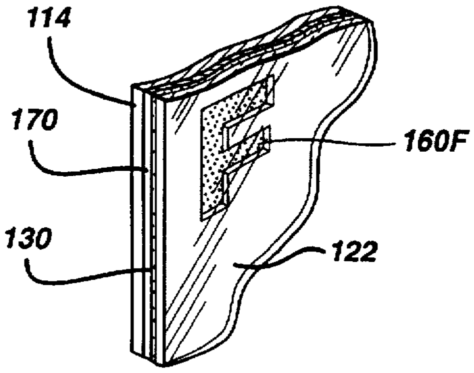
FIG. 19 is a fragmentary view of the parking time permit of FIG. 18 after activation.

In an alternative embodiment of the self-expiring parking permit, shown in FIGS. 18 and 19, the first substrate 114 can be printed entirely with a pattern of soluble ink dots and covered with a mask 170 having a pattern described therethrough. This parking permit operates similarly to the embodiment of FIGS. 8–14, except that the latent information is a function of the pattern described through the mask. In this embodiment, only portions of the pattern on the first substrate 114 are in contact with the opaque adhesive layer 130 underlying transparent film 122, and only those dots in contact with the opaque adhesive layer are able to coalesce and migrate to expose latent information. Thus, the latent information is a function of a pattern described through the mask 170. FIG. 19 is a fragmentary view of indicia area 160F showing with the mask 170 overlying the latent information contained therein.

Alternatively, the transparent film 122 may have a pattern of opaque adhesive on its underside (not shown). Thus, the patterned opaque adhesive on the transparent film contacts only portions of the ink pattern coalescing the pattern which migrates for viewing through the transparent film 122.

Figure 20:
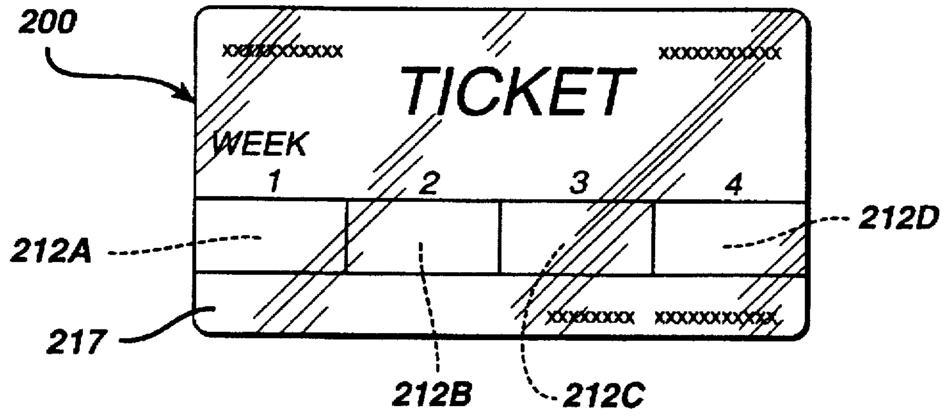
FIG. 20 is a front view of a ticket using an embodiment of this invention.
Figure 21:
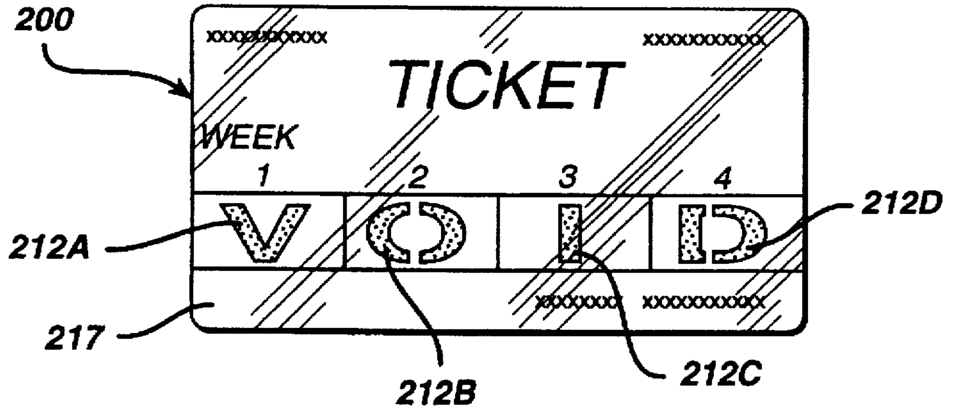
FIG. 21 is a front view of the ticket of FIG. 20 after the elapse of a predetermined period of time.
Figure 22:
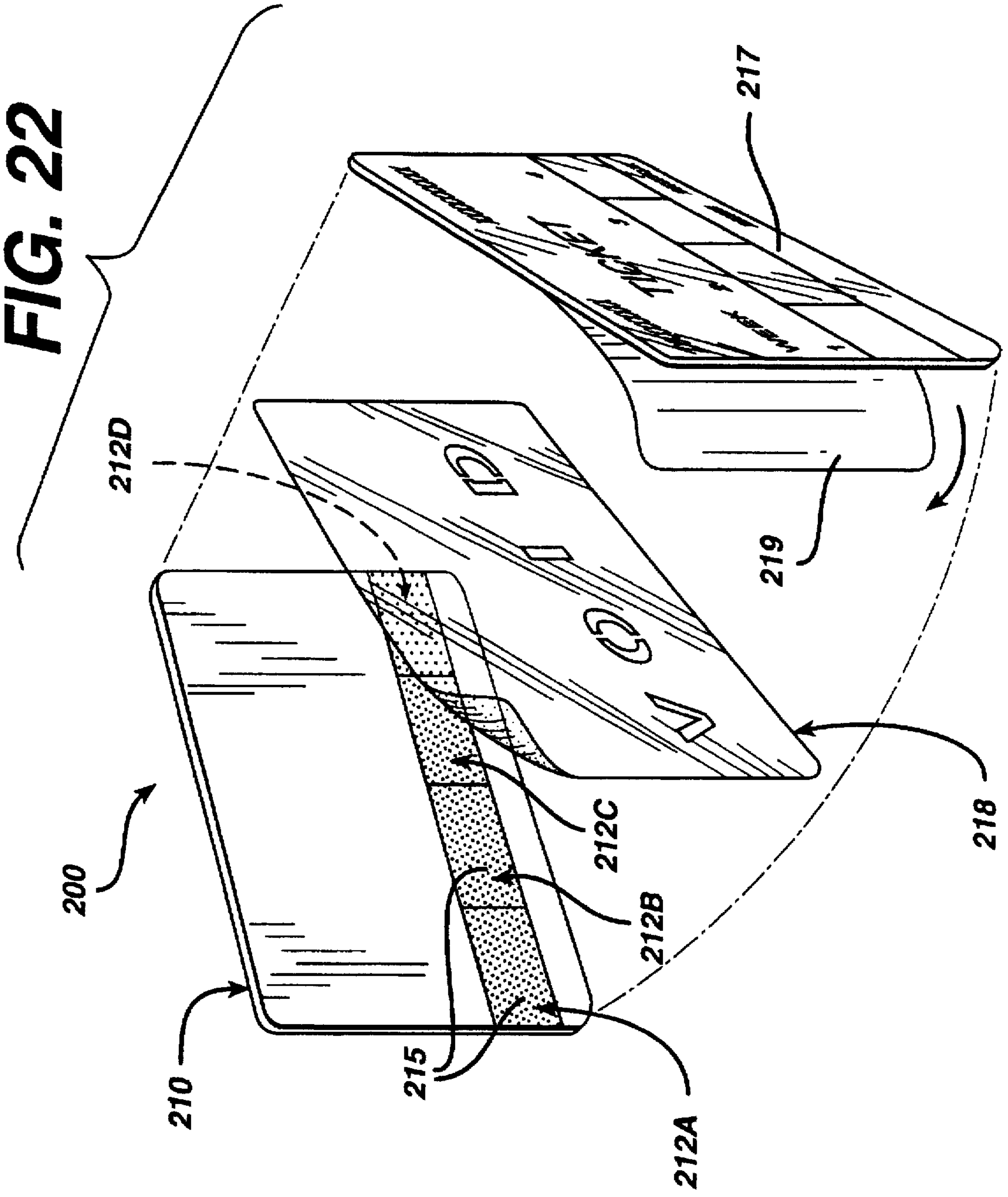
FIG. 22 is an exploded perspective view of the ticket of FIG. 21.

In a preferred embodiment, FIGS. 20, 21 and 22, the patterned indicator is a dynamic ticket 200. The dynamic ticket 200 comprises a substrate 210 containing one or more indicia areas 212A, 212B, 212C, and 212D indicating, respectively, different time intervals. On each indicia area is printed a pattern, typically an array of dots. On issuance, the front part comprising a transparent front support layer 217 and any one of the aforedescribed embodiments of the opaque adhesive layer, is placed over the entire ticket 200. The adhesive on the underside of transparent film 217 is the stimulus which causes some of the individual dots 215 comprising the patterns to coalesce and migrate, thus revealing the latent information within each indicia area. The patterns in the different indicia areas produce the latent information contained therein in different preselected time intervals because of variations in either the dye comprising the dots, the spacing of the dots, the size of the dots, or the solubility of the adhesive.

In the preferred embodiment shown in FIG. 22 the latent information contained on the dynamic ticket 200 is a function of a pattern described through a mask 218. The mask 218 is a thin, transparent film typically laminated to substrate 210. The mask 118 prevents the opaque adhesive on transparent film 117 from contacting parts of the pattern which it overlays. The parts of the pattern which are contacted by the adhesive are activated to reveal latent information. Typically the pattern comprises an array of dots. The dots activated by the adhesive are dissolved and migrate or coalesce to expose the latent information.

The dynamic ticket 200 typically includes the opaque adhesive and transparent film 217 fastened to one side of substrate The opaque adhesive/transparent film 217 is provided with a liner 219 to prevent premature activation of the ticket. At issuance, the liner 219 is peeled from the opaque adhesive/transparent film assembly 217, to expose the adhesive. The film 217 is then placed over substrate 210 to begin activation of the ticket. The opaque adhesive maintains the film 217 in adhesive contact with the substrate 210. The adhesive is strong enough to prevent removal of the transparent film 217 from the substrate 210.

The dynamic ticket 200, in a highly preferred embodiment, is a monthly transit ticket. As shown in FIGS. 20–22, the monthly transit ticket has four indicia areas 212A, 212B, 212C, and 252D thereon, each indicia area representing a week. At the end of week one, section one 212A is self-expired; at the end of week two, section two 212B is self-expired; at the end of week three, section three 2120 is self-expired; and at the end of week four, the entire ticket 200 is expired. In the preferred embodiment, the latent information contained in the sections 212A, 212B, 212C, and 212D is one letter of the word "void", so that after one month the ticket reads "void". While the dynamic ticket is important for indicating the passage of time, its true value lies in its inability to be easily counterfeited because of the progressive change which occurs.

Figure 23:
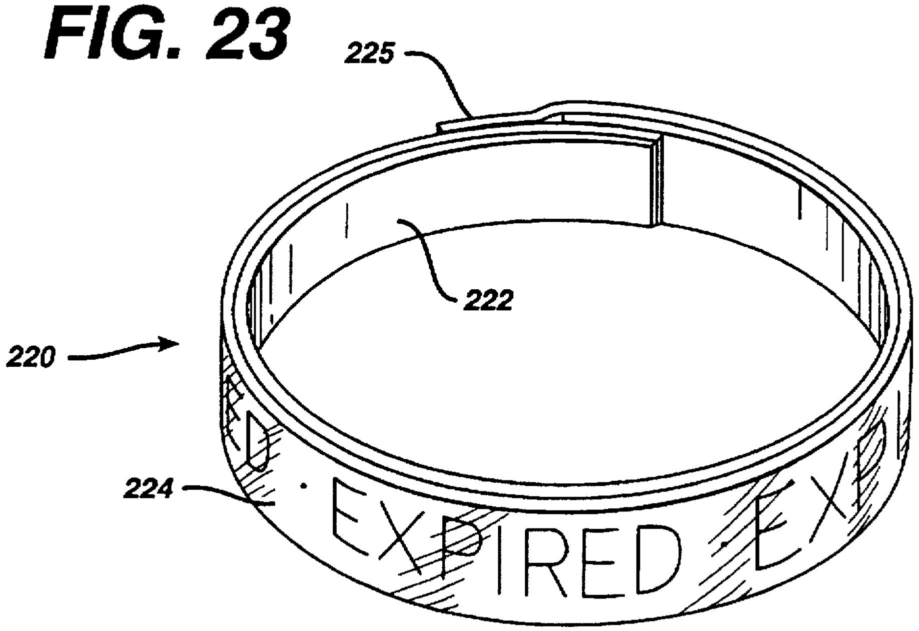
FIG. 23 is a perspective view of a wrist band ticket of this invention after expiration of a predetermined period of time.
Figure 24:
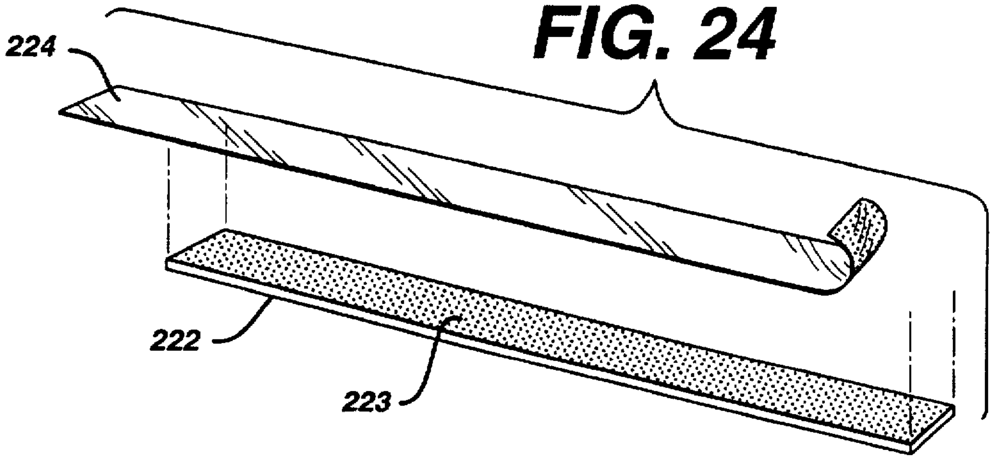
FIG. 24 is a perspective view of the construction of the wrist band ticket of FIG. 23.
Figure 25:
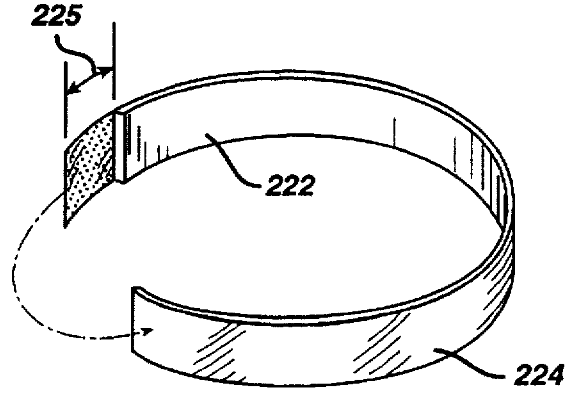
FIG. 25 a perspective view of the wrist band ticket of FIGS. 23 and 24 to be placed on the user, e.g. attendee to an event.

The wrist band ticket, another preferred embodiment of the patterned indication of this invention, is depicted in FIGS. 23–25. It is indicated generally at 220, and comprises an elongated flexible substrate 222 having a pattern 223 thereon and transparent film 224 having any one of the aforedescribed opaque adhesive layers thereon. Typically the pattern 223 is an uniform array of dots. The pattern 223 may be printed of soluble and insoluble inks, the soluble ink dots arranged to contain latent information. Alternatively, the pattern 223 may be printed of soluble ink only and a mask having a pattern described therethrough placed over the pattern, the latent information thus being a function of the pattern described through the mask. The transparent film 224 having the opaque adhesive layer thereon is anchored at one end to substrate 222 and extends a short distance beyond the other end. The transparent film 224 and adhesive coated underside are covered by a liner (not shown) prior to use.

Upon purchase of the wrist band 220, the liner on the opaque adhesive layer of the transparent film 224 is removed to expose the adhesive underside of the transparent film 224. The film 224 is then placed in adhesive contact with the substrate 222. The wrist band 220 is fastened around the wrist of the purchaser; the length 225 of the adhesive film 224 extending past the substrate 222 is used to secure the ends of the substrate together around the purchaser's wrist. The latent information contained in the pattern on the wrist band 220 is brought forth through dot coalescence and migration of the dots/pattern through the opaque adhesive layer, usually in the time period of one day, resulting in, typically, the word "expired" being visible along the circumference of the wrist band 220. See FIG. 23. The self-expired wrist band ticket is thus incapable of being transferred for subsequent use at a subsequent time.

Figure 26:
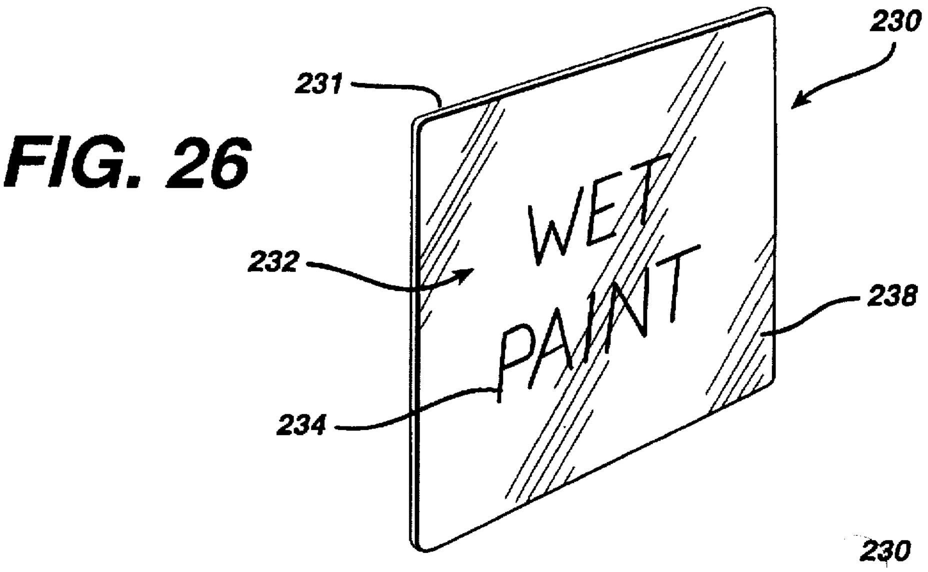
FIG. 26 depicts a warning sign utilizing an embodiment of this invention.
Figure 27:
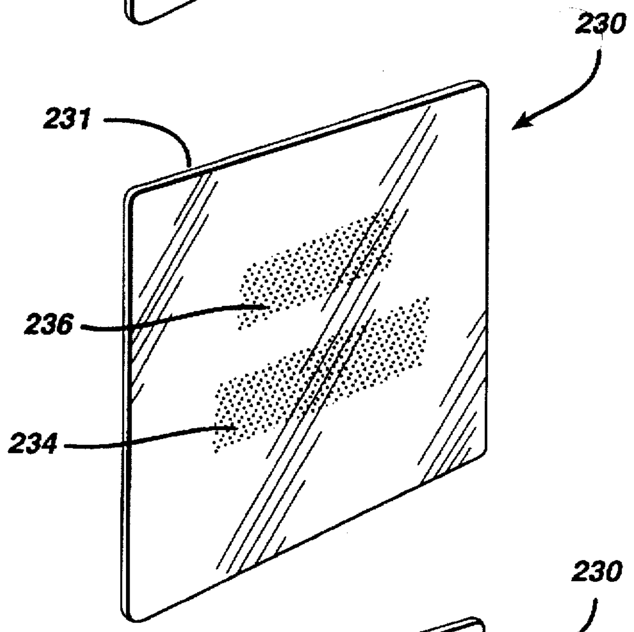
FIG. 27 shows the warning sign of FIG. 26 after a period of time with the warning message blackened out.
Figure 28:
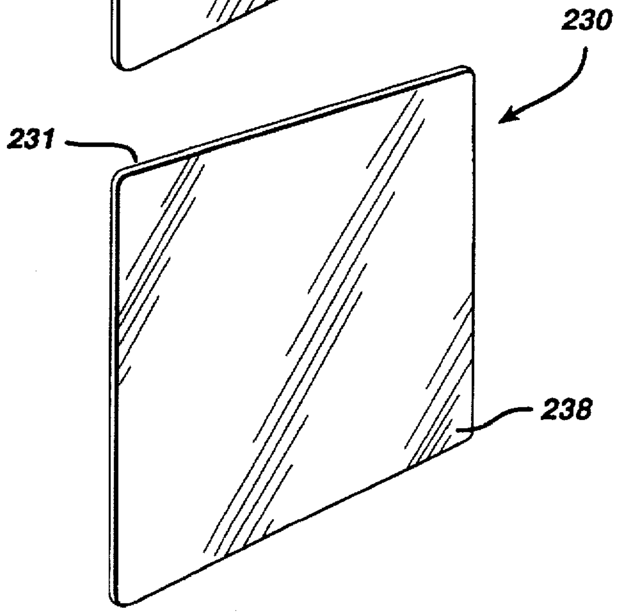
FIG. 28 shows the warning sign of FIG. 26 after a period of time with the warning message bleached.

In FIGS. 26–28, a warning label or sign, indicated generally as 230, is depicted. The warning sign 230 has a substrate 231 with a warning message 232 printed thereon. Typically, the warning message 232 is important for a particular time interval. For instance, a "wet paint" sign is important only for the time period before the paint dries. The patterned indicator of the present embodiment provides for the self-expiration of such warning signs.

Shown in FIG. 27 is a self-expired embodiment of the sign of FIG. 26, wherein the self-expiration arose from the darkening of a pattern 234 surrounding the warning message 232 printed on the underside of the transparent film, to provide a block 236 which conceals the warning message 232. The block 236 results from, typically, the coalescence of the pattern 234 surrounding the warning message 212. The coalescence of the pattern is activated by an opaque adhesive on the underside of transparent film 218. The ink pattern 234 migrates through the opaque adhesive to provide the block 236 which obliterates the warning message.

In an alternative embodiment, FIG. 28, the warning message 232 of the warning sign 230, is bleached by the pattern which migrates through the opaque adhesive, the message disappearing after a predetermined period of time. The bleaching results from the interaction of the opaque adhesive layer on the underside of transparent film 238 with an organic soluble ink pattern which migrates from the rear support member on which it is printed, through the opaque adhesive layer to the warning message 232 causing it to bleach out.

Figure 29A:
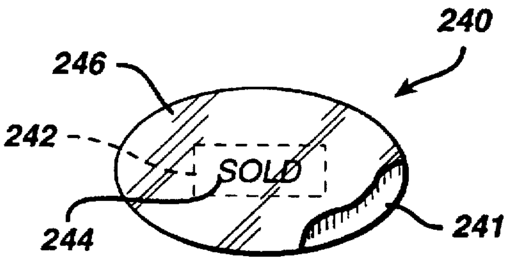
FIGS. 29A and 29B depict an embodiment of the invention directed to a retail label applied to goods, prior to and after the expiration of a period of time.
Figure 29B:
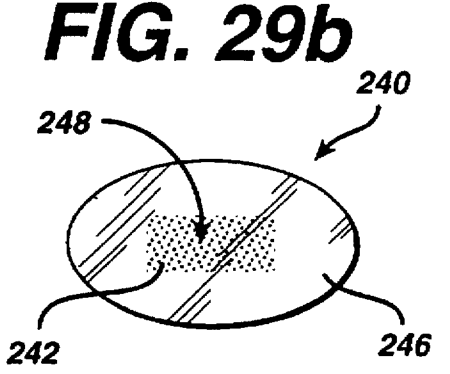

In another preferred embodiment of the patterned indicator, FIGS. 29A and 29B, a self-expiring retail sales sticker 240 is provided. The self-expiring retail sales sticker 240 shown in FIG. 29A is placed on a package at the point of sale. It comprises a substrate 241 having a pattern 242 and transparent film 246 having an opaque adhesive layer thereon for overlaying on the substrate 241 and a message 244 printed on the transparent film 246. The adhesive layer of the film 246 is put into adhesive contact with the pattern when the sticker 240 is issued. The adhesive activates the pattern 242 and brings forth latent information contained within the pattern. The latent information may be a function of different inks with which the pattern is printed, or of a mask. Typically the latent information is brought forth through coalescence and migration of the pattern. Referring to FIG. 29B, typically the latent information is a block 248 surrounding the message which, upon activation darkens the background of the message to block out the message. Thus, after a period of time, preferably a day, the word "sold" is no longer visible. Alternatively, the retail sales sticker may self-expire through the bleaching of the message (not shown). Thus, the self-expired retail sticker 240 is not reusable on subsequent days.

Figure 30:
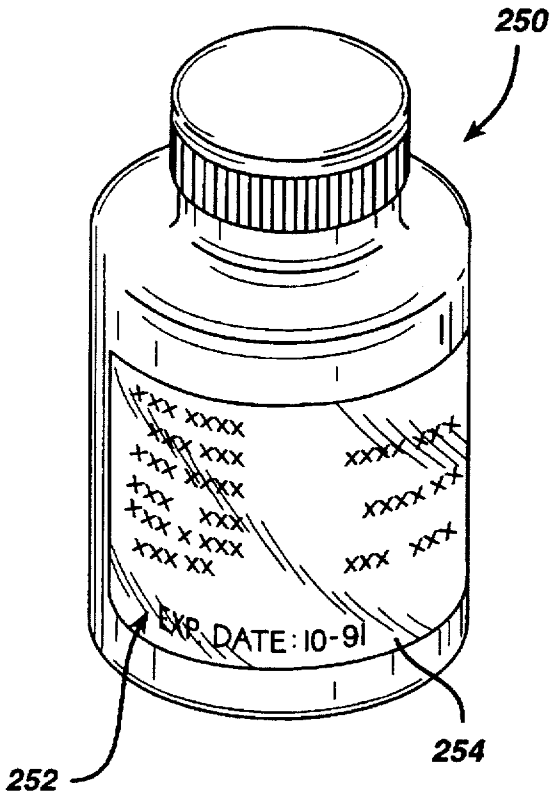
FIGS. 30 and 31 depict another embodiment of the invention which includes the expiration date label on a pharmaceutical container, prior to and after expiration of the indicated date.
Figure 31:
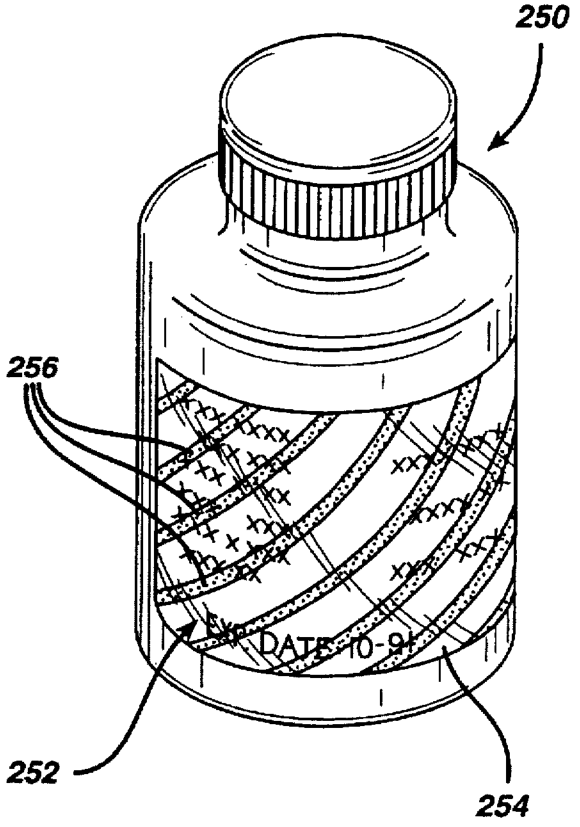

FIGS. 30 and 31, illustrative of another embodiment of a patterned indicator, show a pharmaceutical container 250 having a self-expiring label 252 thereon. The date of self-expiration of the label 252 corresponds to the expiration date of the contents of the pharmaceutical container. The self-expiring label 252 has a rear support member which has printed thereon a pattern having information contained therein. The transparent film has printed thereon the typical information contained on such labels for pharmaceutical containers. The pattern is brought forth by the application of the opaque adhesive layer on the underside of a transparent film 254. The application of the opaque adhesive/transparent film takes place after placement of the pharmaceutical products into container 250. The latent information, in one embodiment, results from the dissolving of soluble ink in a pattern comprising soluble and insoluble ink, and in another embodiment, from soluble ink exposed through a mask (not shown) placed over the pattern.

In the preferred embodiment, FIG. 31, the information which appears after a period of time is a plurality of angled stripes 256, arranged across the face of label 252. In an alternative embodiment (not shown) the background of label 252 turns color to highlight the passage of time and attract attention to the expiration of the useful life of the pharmaceutical products.

Figure 32A:
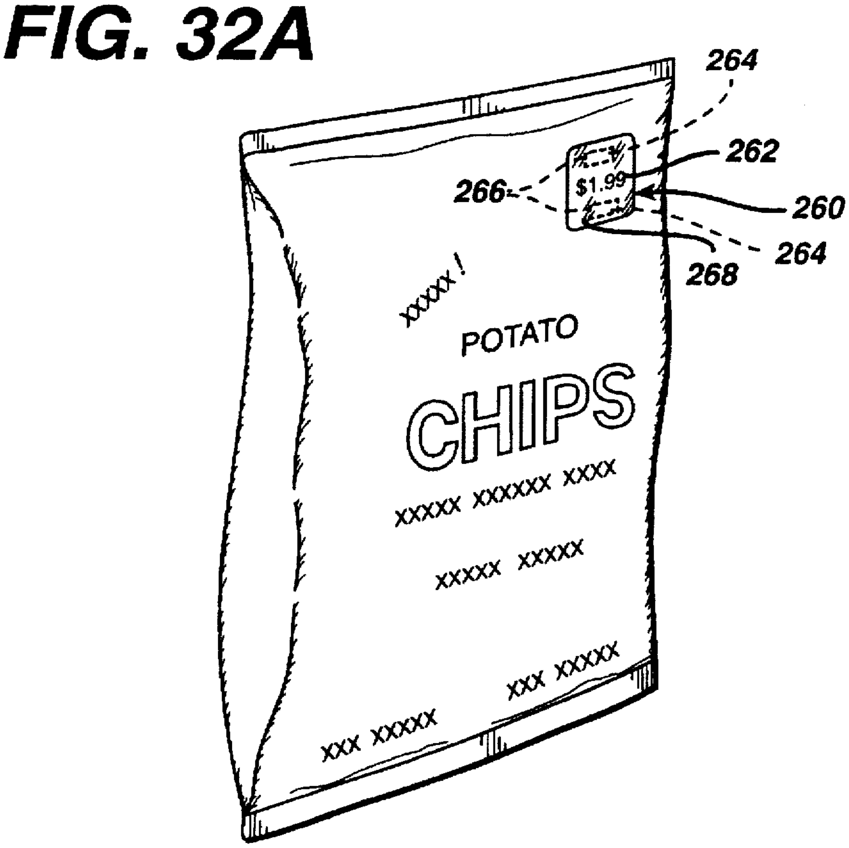
FIGS. 32A and 32B depict a price label embodiment of the invention, prior to and after expiration of a period of time.
Figure 32B:
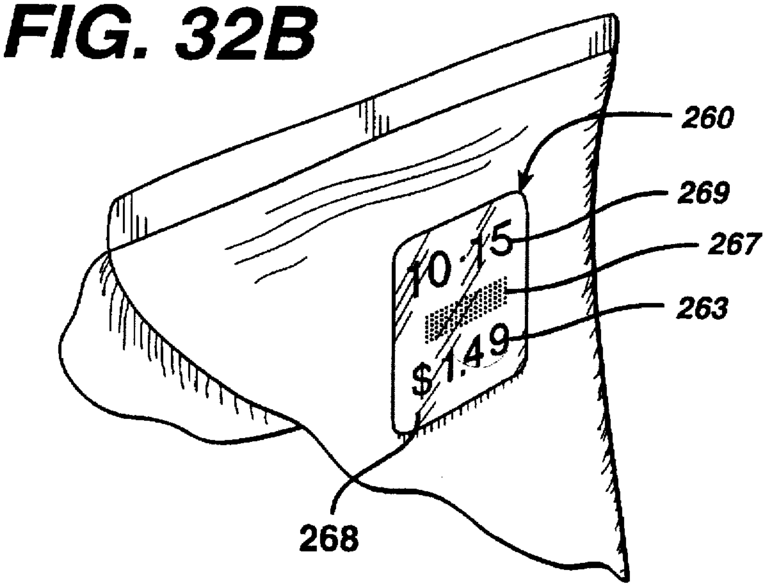

FIGS. 32A and 32B show another embodiment of the patterned indicator for use with retail goods. In this embodiment, the patterned indicator is a dynamic price tag 260. The dynamic price tag 260 comprises a front transparent film having information, such as a price 262, printed thereon, and a rear support substrate having a pattern 264 printed thereon. Typically the pattern 264 is a uniform array of dots. The pattern contains latent information 266 which is brought forth through the process of dissolving portions of the pattern 264 and a coalescing and migration of the inks.

The latent information results from the use of two different inks—a soluble ink and an insoluble ink—or alternatively, the latent information 266 is contained in a transparent mask which is applied over the pattern. This latent information is brought forth by an opaque adhesive on the underside of a transparent film 268 which is placed over said substrate upon the finalization of the manufacture of the product. In the preferred embodiment, Figure 32B, the latent information comprises the date 269 of expiration of the life of the product, the cancellation of the original price 262 by the darkening 267 of its background, and a new, reduced price 263.

Figure 33A:
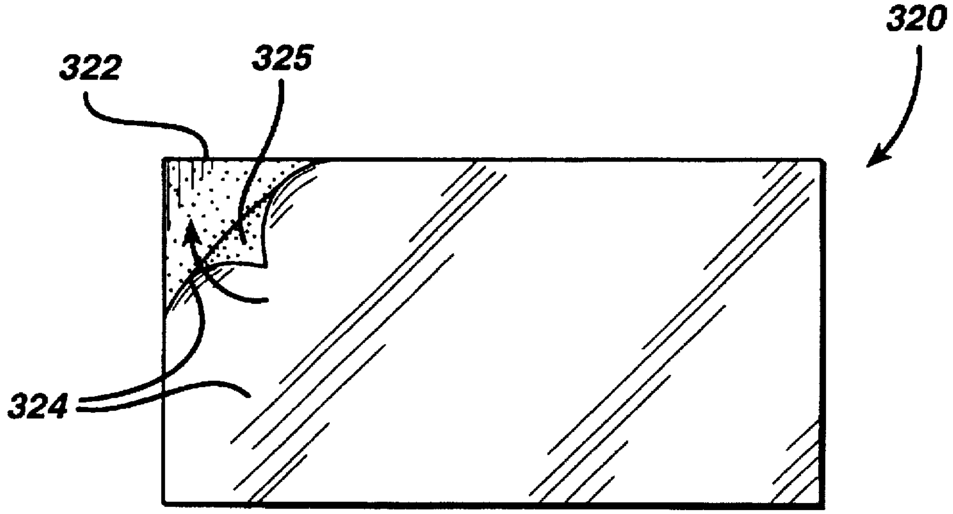
FIGS. 33A and 33B depict an embodiment of the invention comprising a time passage indicator for indicating that oil should be changed.
Figure 33B:
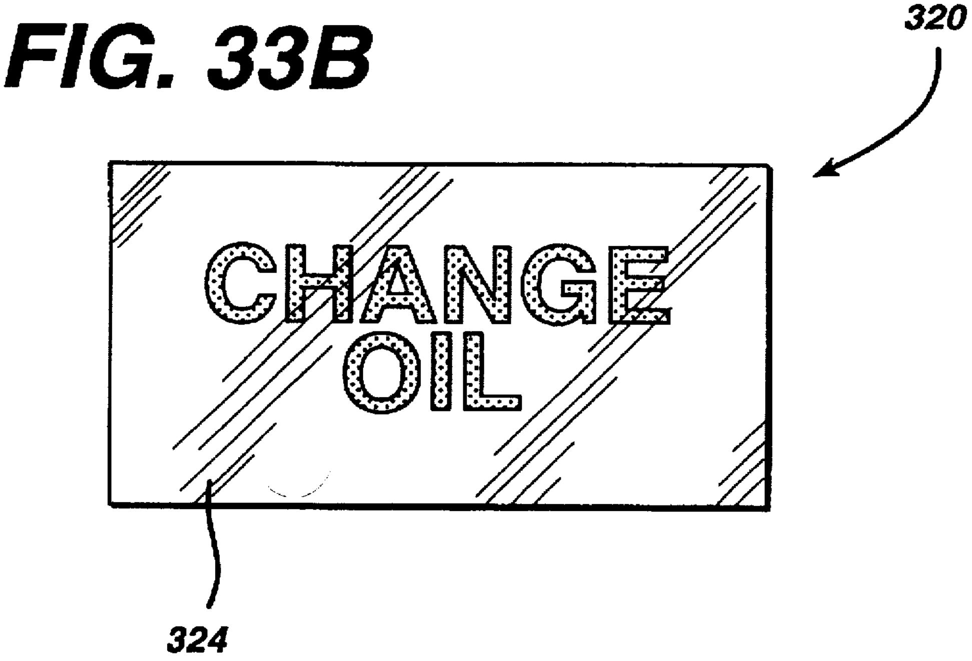

Depicted in FIGS. 33A and 33B is an embodiment of the invention in which the latent information of the indicator alerts someone to perform a task. Typically, the task must be periodically performed, e.g., changing the oil in a car engine. This indicator could also be used to indicate that replacement of a part is needed, or that calibration is required. The indicator 320 of this embodiment comprises a substrate 322 having a pattern printed thereon, and an opaque adhesive/transparent film 324. The indicator 320 is activated by placement of the opaque adhesive/transparent film 324 into adhesive contact with the substrate. Typically the pattern is a uniform array of dots. The adhesive underside 325 of the opaque adhesive/transparent film 324 is the activator for bringing forth the latent information. The latent information may be hidden within pattern as a soluble ink component, or the pattern may be entirely of a soluble ink, and latent information may be a function of a pattern described through a mask (not shown) placed over the pattern. The opaque adhesive dissolves the soluble inks that it contacts, causing the ink to spread out, coalesce and migrate. Thus, the latent information is made visible.

As shown in FIG. 33B, the latent information could be "change oil". Typically, the indicator 320 would be activated after completion of the task to alert one of the next time that the task has to be performed. The time interval needed for the latent information to become visible can be adjusted through various means including: varying the size of the dots, the dot-to-dot distance, the soluble ink component of the dots, and the composition of the opaque adhesive.

Figure 34A:
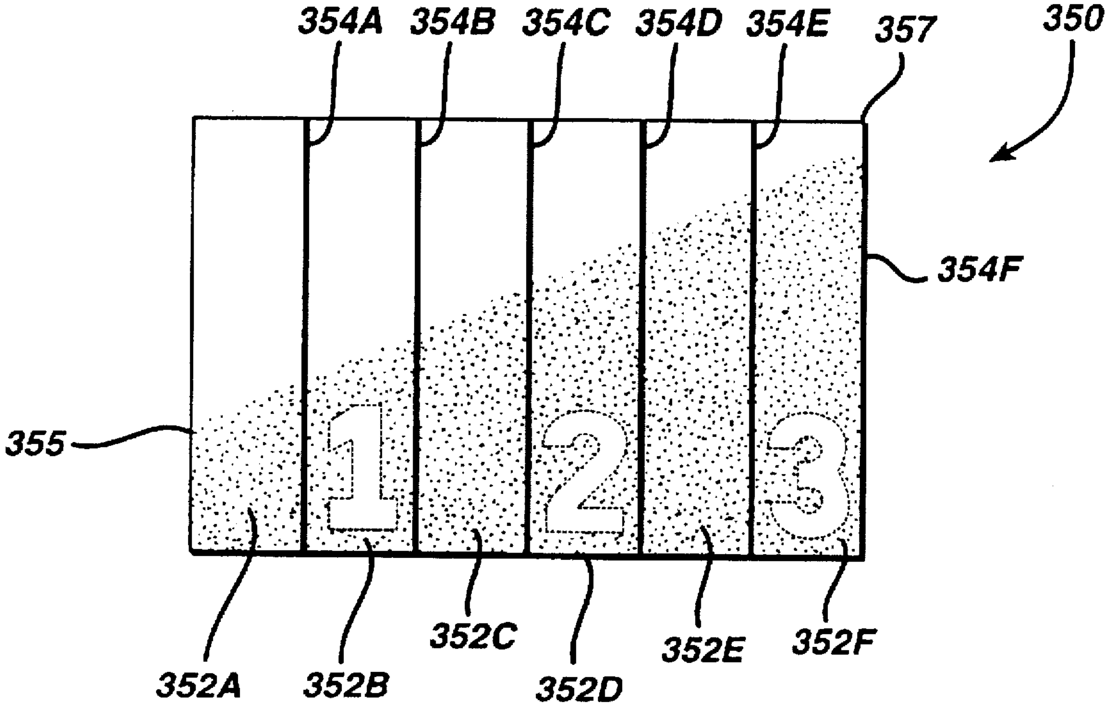
FIG. 34A and 34B show a three month time indicator in unexpired and expired stages respectively.
Figure 34B:
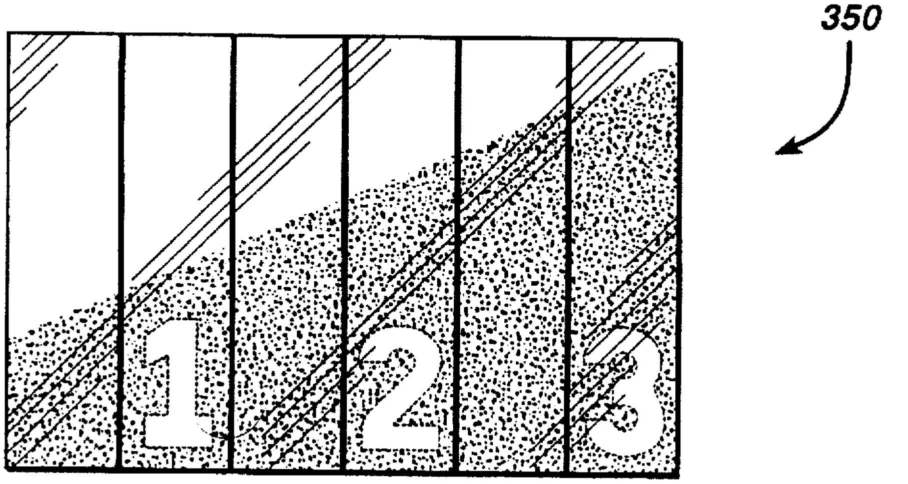

In another embodiment, depicted in FIGS. 34A and 34B, the patterned indicator is a time indicator for indicating passage of relatively long periods of time. In FIGS. 34A and 34B, a three month time indicator 350 is shown. The three month time indicator 350 comprises a substrate having a plurality of patterned areas 352A, 352B, 352C, 352D, 352E, and 352F each having a pattern of dots printed therein. The areas are partitioned by bars 354A, 354B, 354C, 354D, 354E, and 354F which are comprised of a relatively dense pattern of dots. The pattern of dots within the patterned areas 352A–F decrease in density, i.e. the dot to distance is increased, progressively from the first patterned area 352A to the last patterned area 352F. Also, there is a linear increase in the height of the pattern in each patterned areas starting at a relatively low point 355 in the first patterned area 352A, and ending at a relatively high point 357 in the last patterned are 352F, thus furthering the impression of the passage of time. In the preferred embodiment, the numbers 1, 2 and 3 are left undotted, or "stenciled" in successively in every second area 352B, 352D and 352F.

The three month timer 350 is activated by placement of an opaque adhesive/transparent film into adhesive contact with the substrate of the indicator. The adhesive underside of the film coacts with the ink of the dots to cause the ink to dissolve and migrate outward from the center of the dot and through the adhesive layer. Thus, after a period of time, the dots coalesce on the underside of the transparent film to darken the pattern area. In the present embodiment, the dots in the first patterned area 352A, coalesce first because of the greater density with which the patterned is printed. Subsequently, the dots in the second patterned area 352B coalesce, and the stenciled number one is highlighted. The dots in the second patterned area 352B generally coalesce upon the passage of one month. While dot dissolving occurs in all patterned areas simultaneously, because of the variation in the density of the pattern in the patterned areas, dot coalescence does not cause a change visually perceptible until the passage of the specified interval.

FIG. 34B depicts the three month indicator after the passage of three months from the time of activation. The passage of the specified time period is indicated by the coalescence of the dots in all patterned areas 352A–F to darken each patterned area. In another embodiment, the dots comprise soluble and nonsoluble components, and the soluble components migrate to indicate passage of the specified time period. Further, the soluble components may be of various colors so that a color change visible in the patterned areas 352A–F indicates the passage of a specified interval of time.

Figure 35A:
FIGS. 35A and 35B are illustrative of an alternative embodiment of a self-expiring visitor's pass in valid and expired stages respectively.
Figure 35B:
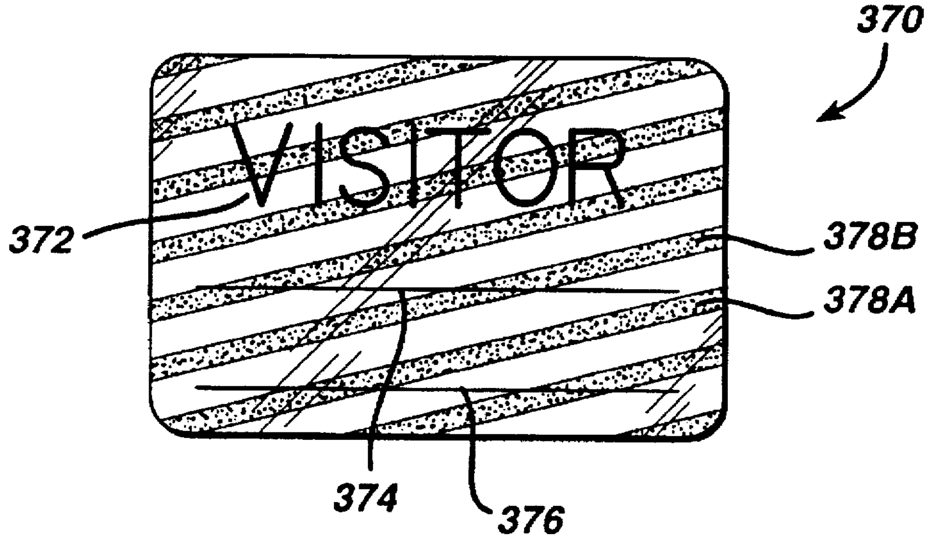

In another preferred embodiment, depicted in FIGS. 35A and 35B, the patterned indicator is self-expiring visitor's pass 370. In this embodiment, the pass comprises a first substrate having a pattern printed thereon, and a second transparent substrate having an opaque adhesive activator on its underside. Information 372, ("visitor" in the embodiment shown), may be printed on the first or second substrate. Further, lines 374 and 376 are provided to allow for the inclusion of additional information.

The pattern printed on the rear substrate comprises a plurality of dots printed of only a soluble ink in discrete areas. Preferably the discrete areas define diagonal bars 378A, 378B, etc. Prior to activation, the pattern on the rear substrate is not readily visible from any significant distance (i.e. greater than a few feet) because of the faintness with which the dots are printed. At issuance, the transparent substrate having an opaque adhesive layer thereon is placed into adhesive contact with the printed surface of the rear substrate. The adhesive layer coacts with the soluble ink to cause the ink to bleed and darken the discrete printed areas and migrate through the adhesive layer, thus self-expiring. Further, the dots may be printed to outline or stencil information such as the word "expired" along diagonal bars 378A, 378B, etc. Alternatively, dots of varying sizes can be employed to reveal information upon activation.

Generally, the self-expiring visitor's badge 370 of this embodiment is a low cost badge, the first substrate typically being paper. However, any badge type, including self-adhesive badges, badge inserts, paper and plastic badges, pin-feed badges, etc., are within the scope of this embodiment. Also, these badges are generally designed to self-expire within a few hours. Further, the time interval between activation and expiration may be varied by printing patterns of a greater or lessor density. For example, a very fine pattern comprising 100 to 140 dots per inch rapidly darkens, but does not become as dark as a coarse pattern of dots having 40 to 80 dots per inch. Finally, in order to assume faintness and the appearance of invisibility, all dots on the visitor's pass of this embodiment are printed of a uniform tint, generally on the order of 10%. However, these dots may be thick, i.e. high, so as to contain a substantial volume of ink. This large volume of ink becomes very dark and becomes large dots when absorbed into the adhesive layer.

In all of the embodiments described herein, almost any opaque adhesive may be used which is receptive to dyes or inks. An adhesive that is "receptive" is an adhesive that is capable of dissolving an ink, causing the ink to migrate away from a point of application. By adding polar and/or non-polar materials to the adhesive the adsorption properties of the adhesive can be altered. Preferred adhesives are from Avery Company, Fasson Films Division, Painesville, Ohio.

The time indicator of this invention has many uses. Other embodiments include, but are not limited to:

- a self-timing sticker for visual validation of electronic access cards;
- a safety sticker that develops out warning words such as "Danger" after a specific time;
- a time-temperature food spoilage indicator, a time indicator sticker for biological industrial processes, laboratory experiments, field testing, etc. where a clock or timer is impractical or too expensive;
- a service sticker that shows words such as "Service Required" after a service or preventative maintenance time;
- a property pass/luggage tab/bar coding sticker that self-expires to prevent reuse;
- a shipping sticker that changes color to flag urgent or dated shipments that are overdue or about to be missed;
- a crime scene/frangible security seal that is tamper evident by varying printed patterns of different inks; and
- a ski ticket/entertainment park pass that self-expires.

The initiation or activation of the ink migration through the opaque adhesive may be by many means, for example, by heat, light, water, solvent, pressure, etc. Any stimulus that causes the color edges to spread and migrate through the opaque adhesive or behave differently will produce visible information.

In all embodiments of the patterned indicator, the visually perceptible changes can be caused by an increase in dot density, or by a color variation, or both. Typically, a change in color may result because a dot printed with a number of component inks looks black. However, only one component may be soluble, and only that component migrates. Thus, the visible color change corresponds to the color of the soluble component of the dot.

Further, it is within the scope of this invention for the patterns to be comprised of solid ink. In such embodiments, the solid ink pattern is typically comprised of at least two components of differing colors, one of which can be bled out to produce a color change. Further, a mask can be used such that the color change only takes place in discreet areas. Thus, the solid ink pattern can withhold latent information.

Preferred inks for use with this invention are from Gans Ink Company, Los Angeles, California. In particular Pyroscript Sublimation Inks, e.g., Ink Nos. 57977, 57976, Heat Transfer Inks, Turn-A-Bout, Sunrise Process, Sunburst Process and Turn-A-Bout R.S. series inks. Other manufacturers include Superior Ink Co. in New York and Proflexo. Sublimation and heat transfer type inks are generally low molecular weight dyes that can bleed. Standard inks which do not bleed include particles, i.e., finely ground non-migrating solids (vis-a-vis molecules) which provide deep colors.

The adhesive activator preferably is a standard adhesive such as No. 287, manufactured by H & N Chemical Adhesives. The stimulus effect of the activator can be increased or decreased by modifying the adhesive. Adding a plasticizer to the adhesive increases the rate of migration. Typically, a plasticizer is added when the indicator is used in cold environments, while the standard cold environments, while the standard adhesive is suitable for environments over 60° F.

All of the foregoing uses of the time indicator of this invention may be accomplished by varying certain attributes of the indicator as broadly and specifically described herein.

We claim:

1. A fast-acting time color indicator comprising:

a base layer bearing on a portion thereof a message printed with an ink containing a migrating agent;

an activation layer having a transparent layer, an adhesive polymer coating coated onto a first surface of said transparent layer, and a release sheet covering a portion of said coating, said activation layer assuming a first, non activated position, said actuation layer assuming a second, activated position with said release sheet removed and said polymer coating directly contacting said printed portion, said migrating agent migrating through said polymer coating to display said message at said first surface, said migrating agent migrating through said coating to display said message in less than twenty four hours.

2. The apparatus of claim 1 wherein said base layer further comprises a transparent impermeable layer with an adhesive base layer coating and base layer release sheet disposed on the base layer surface opposite to said printed portion.

3. The apparatus of claim 1, wherein said printed portion further comprises a non-migrating printed component printed with an ink not containing a migrating agent and a migrating printed component printed with an ink containing a migrating agent.

4. The apparatus of claim 3, wherein said non-migrating printed component camouflages said migrating printed component when said activation layer assumes said first, non-activated position.

5. A fast-acting time color indicator comprising:

a base layer bearing on at least a portion thereof a message printed with an ink containing a migrating agent; and an activation layer having a transparent layer and an adhesive polymer coating, said activation layer assuming a first, non-activated position with said polymer coating contacting a release sheet and a second, activated position with said polymer coating removed from said release sheet and directly in contact with said ink containing a migrating agent, said migrating agent migrating through said polymer coating to display said message in less than 24 hours.

6. The indicator according to claim 5 further comprising camouflage printing surrounding said message on said base layer, said camouflage printing being printed with an ink not containing a migrating agent.

* * * * *